United States Patent
Hirayama

(10) Patent No.: US 12,363,412 B2
(45) Date of Patent: Jul. 15, 2025

(54) ILLUMINATION APPARATUS FOR REDUCING TEMPERATURE RISE DUE TO LIGHT EMISSION AND CONTROL METHOD

(71) Applicant: CANON KABUSHIKI KAISHA, Tokyo (JP)

(72) Inventor: Keita Hirayama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 146 days.

(21) Appl. No.: 18/463,039

(22) Filed: Sep. 7, 2023

(65) Prior Publication Data

US 2024/0089575 A1    Mar. 14, 2024

(30) Foreign Application Priority Data

Sep. 9, 2022   (JP) ................ 2022-143623

(51) Int. Cl.
*H04N 23/56* (2023.01)
*G03B 15/05* (2021.01)
*G03B 17/55* (2021.01)

(52) U.S. Cl.
CPC ........... *H04N 23/56* (2023.01); *G03B 15/05* (2013.01); *G03B 17/55* (2013.01); *G03B 2215/0514* (2013.01)

(58) Field of Classification Search
CPC ........ H04N 23/56; G03B 15/05; G03B 17/55; G03B 2215/05; G03B 2215/0514; G03B 2215/0532; G03B 2215/0535; G03B 2215/0567; G03B 2215/0578; G03B 2215/0589; G03B 2215/0592

See application file for complete search history.

(56) References Cited

U.S. PATENT DOCUMENTS

| | | | | |
|---|---|---|---|---|
| 2017/0257541 A1* | 9/2017 | Saito | ................ | G03B 15/05 |
| 2019/0223277 A1* | 7/2019 | Saito | ................ | H05B 41/30 |
| 2020/0278108 A1* | 9/2020 | Saito | ................ | G03B 7/22 |
| 2023/0142109 A1* | 5/2023 | Sugawara | ............ | H05B 45/18 |
| | | | | 315/308 |

FOREIGN PATENT DOCUMENTS

JP    2006058490 A    3/2006

* cited by examiner

*Primary Examiner* — Daniel M Pasiewicz
(74) *Attorney, Agent, or Firm* — Canon U.S.A., Inc. IP Division

(57) ABSTRACT

An illumination apparatus includes a first target portion including a light source, a second target portion different from the light source, and a processor configured to function as a light emission control unit, a calculation unit, and a control unit. The light emission control unit is configured to control a light emission operation of the light source. The calculation unit is configured to, based on heat generated by the light emission operation of the light source, calculate a first control temperature and a second control temperature. The control unit is configured to control the light emission operation. The calculation unit calculates the first control temperature based on a first influence degree of the heat generated by the light emission operation and calculates the second control temperature based on a second influence degree of the heat generated by the light emission operation different from the first influence degree.

15 Claims, 17 Drawing Sheets

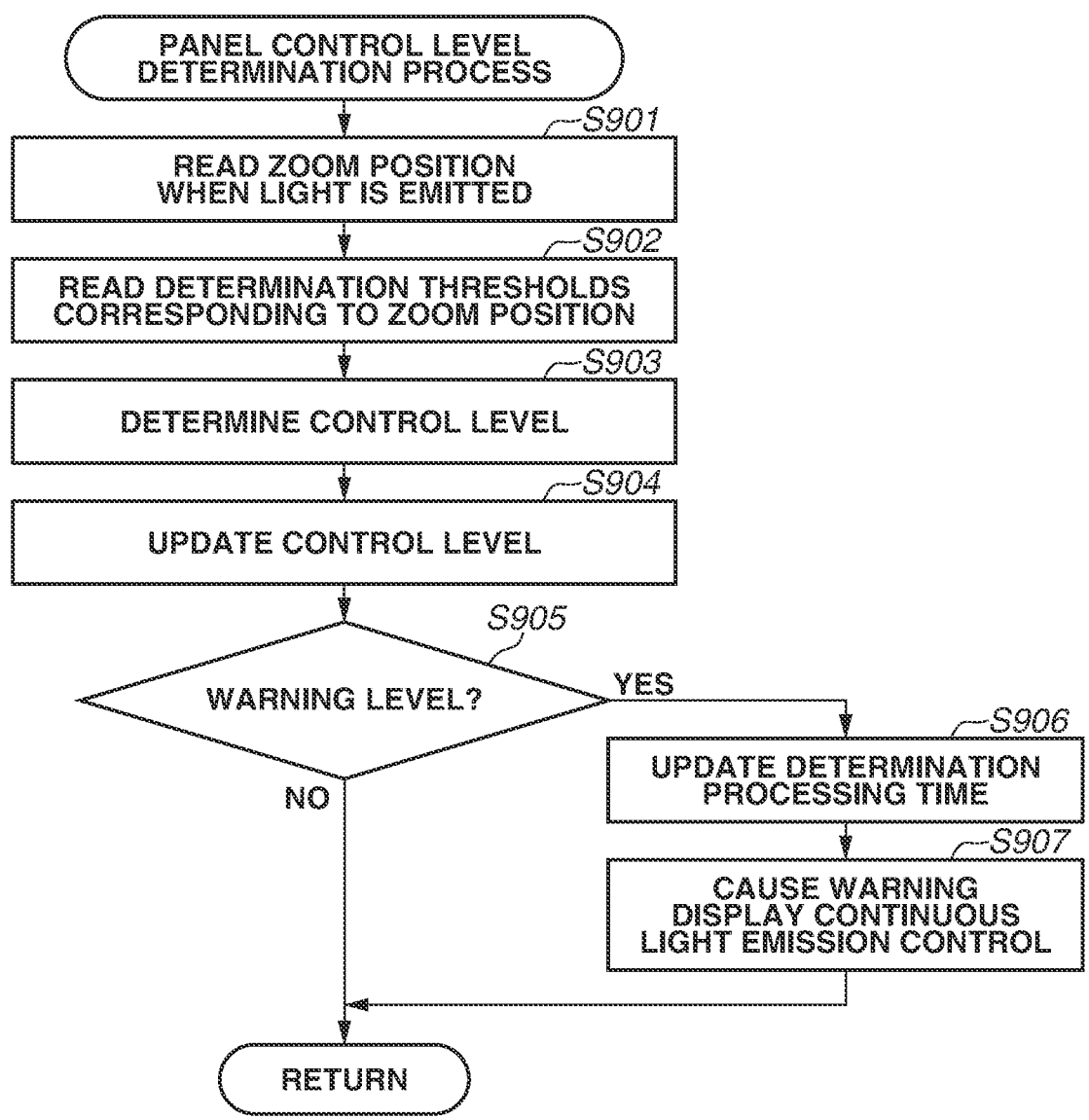

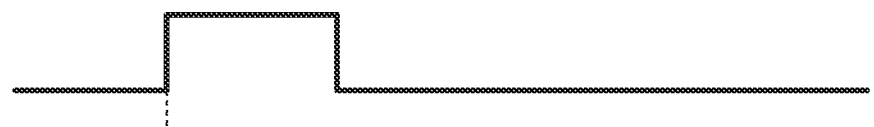
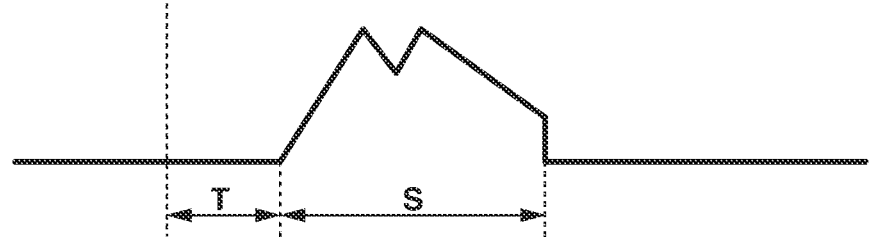
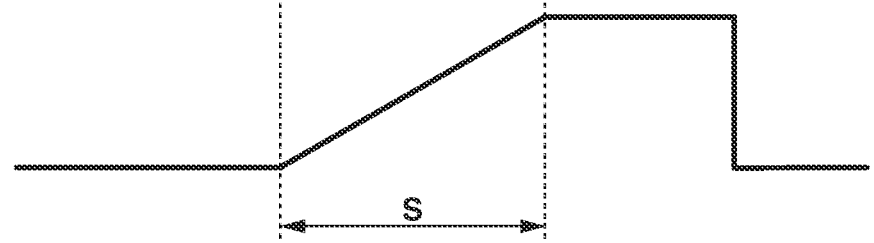
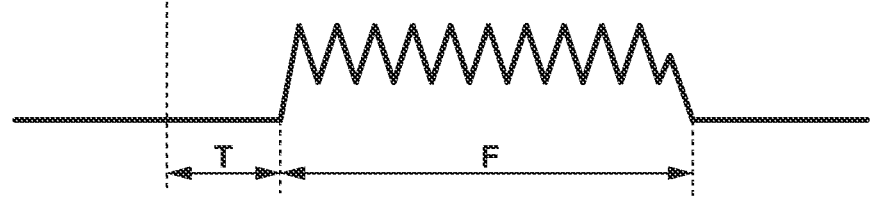
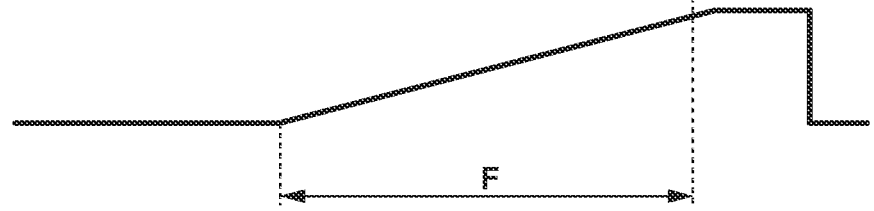

ILLUMINATION APPARATUS FOR REDUCING TEMPERATURE RISE DUE TO LIGHT EMISSION AND CONTROL METHOD

BACKGROUND

Field

The present disclosure relates to an illumination apparatus and a control method for controlling the same, and in particular, relates to an illumination apparatus for reducing a temperature rise due to light emission.

Description of the Related Art

Conventionally, some illumination apparatus appropriately controls the temperature rise in an optical panel placed on the front surface of the illumination apparatus so that the temperature of the optical panel is in a temperature range where the optical panel can be safely used when a light-emitting unit continuously emits light.

The publication of Japanese Patent Application Laid-Open No. 2006-58490 discusses an illumination apparatus that, based on a control temperature as the relative temperature of an optical panel, controls the operation output of a cooling unit that cools the optical panel.

The publication of Japanese Patent Application Laid-Open No. 2006-58490 also discusses a flash apparatus that, based on the time in which flash light emission is performed and the light emission amounts of the flash light emission, if the sum of the light emission amounts reaches a predetermined value within a predetermined time, performs a process for lessening the temperature rise in a component that generates heat. The publication of Japanese Patent Application Laid-Open No. 2006-58490, however, does not take into account the temperature rise near a light source based on the difference in light emission operation. Particularly, in image capturing using the illumination apparatus, and in light emission operations such as multi-light emission in which a light source repeatedly emits light for a short time and flat light emission in which the light source continues to emit light for a time longer than in flash light emission, the light source may cease to emit light due to the temperature rise in the light source.

SUMMARY

An illumination apparatus according to the present disclosure includes a first target portion including a light source, a second target portion different from the light source, and a processor configured to function as a light emission control unit, a calculation unit, and a control unit. The light emission control unit is configured to control a light emission operation of the light source. The calculation unit is configured to, based on heat generated by the light emission operation of the light source, calculate a first control temperature as a relative temperature of the first target portion and a second control temperature as a relative temperature of the second target portion. The control unit is configured to control the light emission operation based on at least one of the first and second control temperatures. The calculation unit calculates the first control temperature based on a first influence degree of the heat generated by the light emission operation and calculates the second control temperature based on a second influence degree of the heat generated by the light emission operation different from the first influence degree.

Further features of the present disclosure will become apparent from the following description of exemplary embodiments with reference to the attached drawings.

BRIEF DESCRIPTION OF THE DRAWINGS

FIG. 9 is a flowchart for a panel control level determination process in step S508 in FIG. 5.

FIGS. 16A to 16F are graphs each illustrating a time axis from a start to an end of light emission from the discharge tube.

DESCRIPTION OF THE EMBODIMENTS

Exemplary embodiments of the present disclosure will be described in detail below based on the attached drawings. In the following, the term "unit" may have different meanings depending on the context. The usual meaning is an individual element, single and complete. The phrase "units of" may refer to a plurality of elements or a group of elements. In addition, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or program that, when executed by the CPU, cause the CPU to perform operations corresponding to units or functions. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials. Furthermore, depending on the context, the term "portion," "part," "device," "switch," or similar terms may refer to a circuit or a group of circuits. The circuit or group of circuits may include electronic, mechanical, or optical elements such as capacitors, diodes, transistors. For example, a switch is a circuit that turns on and turns off a connection. It can be implemented by a transistor circuit or similar electronic devices.

Figure 1:
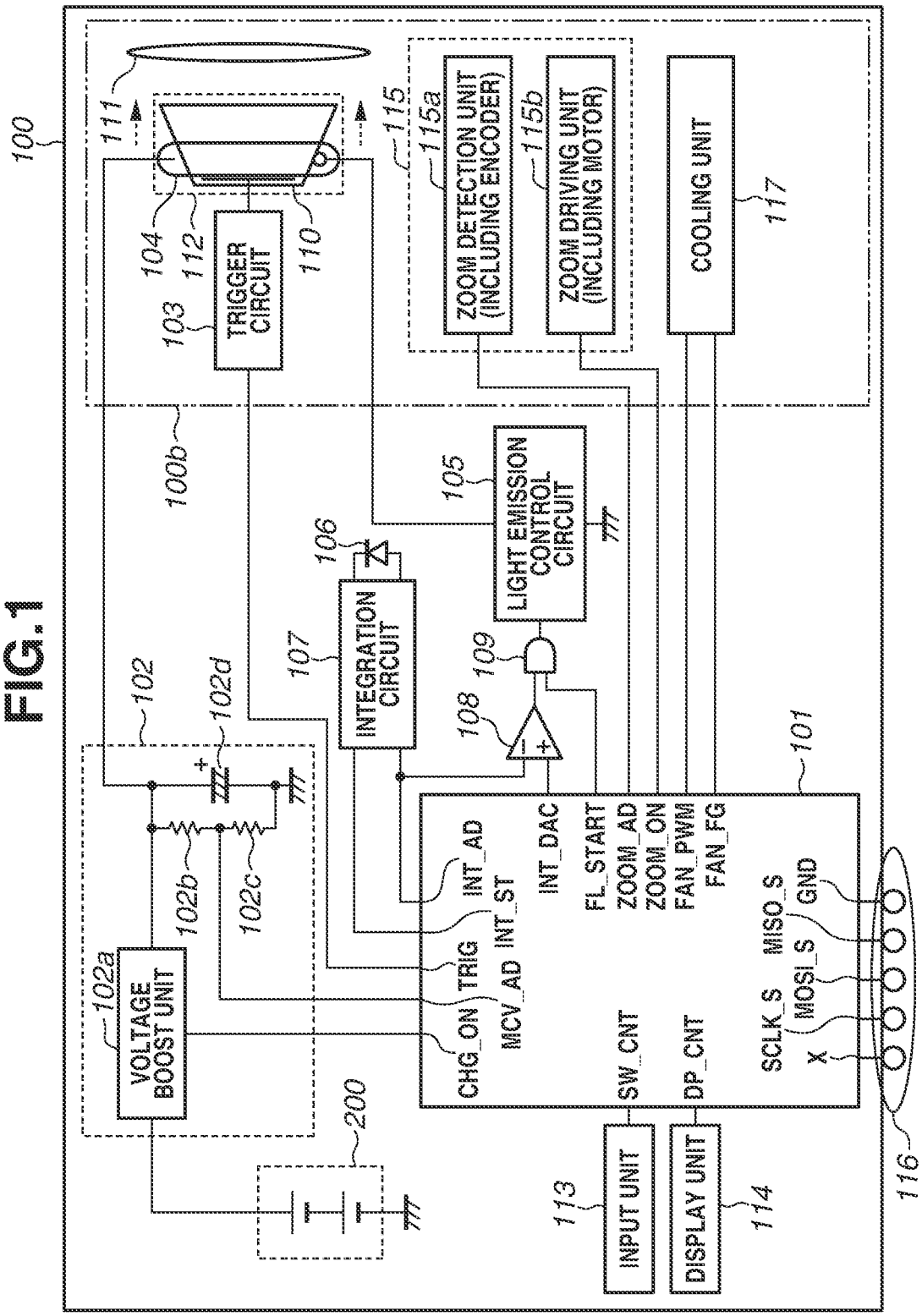
FIG. 1 is a block diagram illustrating a schematic configuration of an illumination apparatus according to a first exemplary embodiment of the present disclosure.
Figure 2:
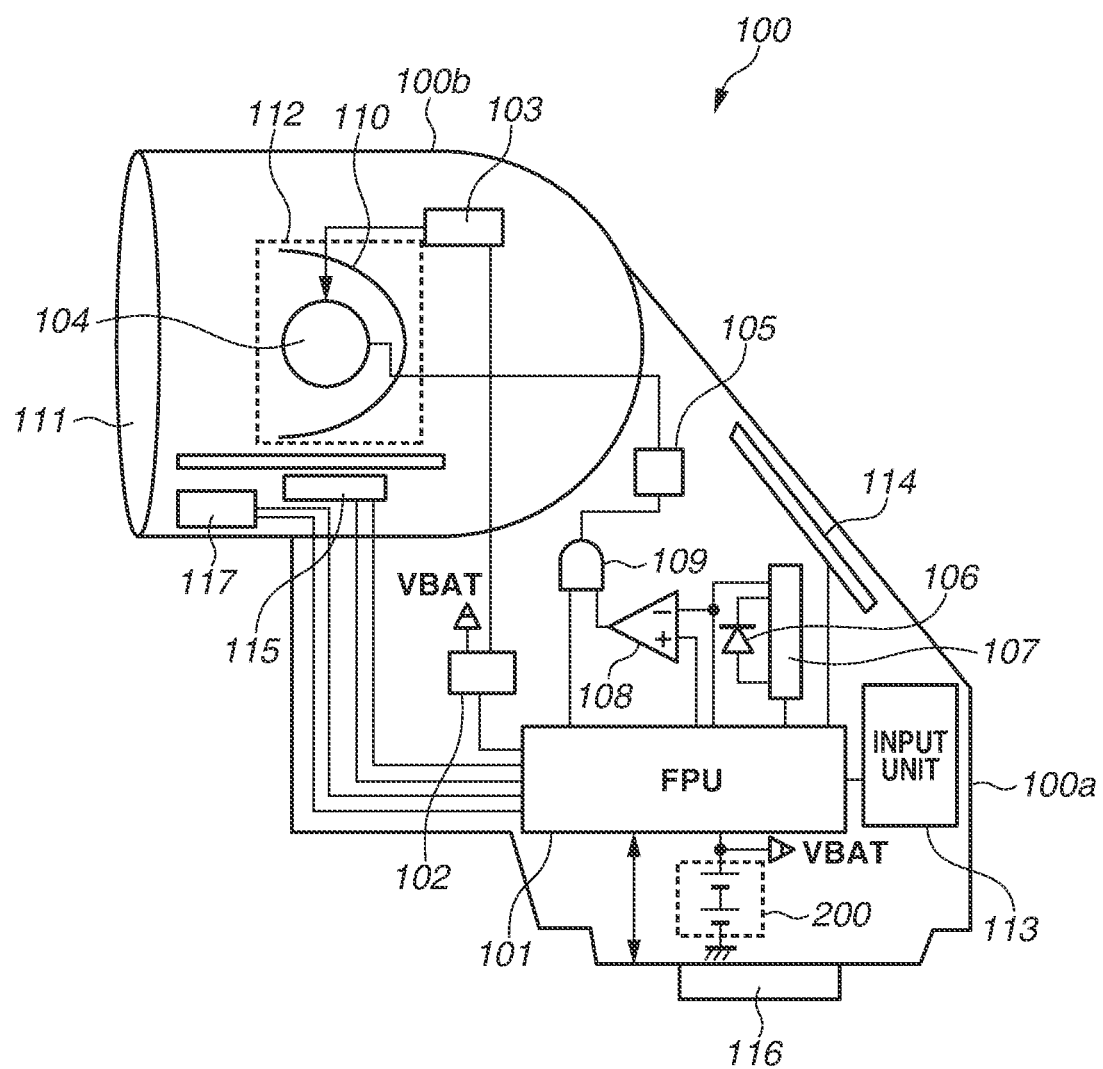
FIG. 2 is a diagram illustrating a schematic cross section of the illumination apparatus.

FIG. 1 is a block diagram illustrating the schematic configuration of an illumination apparatus 100 as an illumination apparatus according to a first exemplary embodiment of the present disclosure. FIG. 2 is a diagram illustrating a schematic cross section of the illumination apparatus 100. In FIGS. 1 and 2, the same component is designated by the same sign.

First, the configuration of the illumination apparatus 100 is described. As illustrated in FIG. 2, the illumination apparatus 100 includes a main body portion 100a detachably attached to a camera main body (not illustrated), and a light-emitting unit 100b held to be rotationally movable in the up-down direction and the left-right direction relative to the main body portion 100a. In the present exemplary embodiment, the rotational movement directions of the light-emitting unit 100b are defined on the premise that the side of the main body portion 100a coupled to the light-emitting unit 100b is the upper side.

A microcomputer floating-point unit (FPU) (hereinafter, "microcomputer") 101 controls the components of the illumination apparatus 100. For example, the microcomputer 101 has a circuit configuration of a one-chip integrated circuit (IC) with a built-in microcomputer including a central processing unit (CPU), a read-only memory (ROM), a random-access memory (RAM), an input/output control circuit (I/O control circuit), a multiplexer, a timer circuit, an Electrically Erasable Programmable Read-Only Memory (EEPROM), an analog-to-digital (A/D) converter, and a digital-to-analog (D/A) converter. The CPU is a programmable device or processor that executes a program stored in the ROM or RAM to perform operations as described in the following.

A battery 200 functions as a power supply (VBAT) of the illumination apparatus 100. As illustrated in FIG. 1, a voltage boost circuit block 102 includes a voltage boost unit 102a, resistors 102b and 102c used to detect voltages, and a main capacitor 102d. The voltage boost circuit block 102 boosts the voltage of the battery 200 to several hundreds of volts using the voltage boost unit 102a and charges the main capacitor 102d with electric energy for light emission. The charged voltage of the main capacitor 102d is divided by the resistors 102b and 102c, and the divided voltage is input to an A/D conversion terminal MCV_AD of the microcomputer 101.

A trigger circuit 103 applies a pulse voltage for exciting a discharge tube 104 to the discharge tube 104. A light emission control circuit 105 controls the start and the stop of light emission from the discharge tube 104.

If the discharge tube 104 (a light source) receives a pulse voltage of several kilovolts applied from the trigger circuit 103, the discharge tube 104 is excited and emits light using electric energy charged in the main capacitor 102d.

A photodiode 106 is a sensor that receives light emitted from the discharge tube 104. The photodiode 106 receives light emitted from the discharge tube 104 directly or via glass fibers. An integration circuit 107 integrates a light reception current of the photodiode 106, and the output of the integration circuit 107 is input to an inverting input terminal of a comparator 108 and an A/D converter terminal INT_AD of the microcomputer 101. A non-inverting input terminal of the comparator 108 is connected to a D/A converter terminal INT_DAC in the microcomputer 101, and the output of the comparator 108 is connected to an input terminal of an AND gate 109. The other input of the AND gate 109 is connected to a light emission control terminal FL_START of the microcomputer 101, and the output of the AND gate 109 is input to the light emission control circuit 105.

A reflective umbrella 110 reflects light emitted from the discharge tube 104 and guides the reflected light in a predetermined direction. An optical panel 111 is an optical member placed in front of the discharge tube 104, is included in a zoom optical system (not illustrated), and is held so that the relative position between the optical panel 111 and a reflective umbrella unit or circuit 112 including the discharge tube 104 and the reflective umbrella 110 (a zoom position) can be changed. The relative position between the reflective umbrella unit 112 and the optical panel 111 is thus changed, whereby it is possible to change the emission angle of the illumination apparatus 100 and change the guide number. The light-emitting unit 100b mainly includes the discharge tube 104, the reflective umbrella 110, and the optical panel 111, and the emission direction of the light-emitting unit 100b changes by rotationally moving relative to the main body portion 100a.

An input unit or circuit 113 includes a power switch, a mode setting switch for setting the operation modes of the illumination apparatus 100 including the driving setting of a cooling unit or circuit 117 according to user operations, and setting buttons for setting various other parameters according to user operations. The microcomputer 101 executes various processes according to inputs to the input unit 113. A display unit or circuit 114 includes a liquid crystal device and a light-emitting element and displays the states of the illumination apparatus 100.

A zoom driving circuit or circuit 115 includes a zoom detection unit 115a that detects information regarding the relative position between the reflective umbrella unit 112 and the optical panel 111 using an encoder, and a zoom driving unit 115*b* including a motor for moving the reflective umbrella unit 112. The amount of movement of the reflective umbrella unit 112 by the zoom driving unit 115*b* is calculated by the microcomputer 101 based on focal length information regarding an imaging lens obtained via the camera main body.

Terminals 116 include a terminal SCLK_S for synchronizing communication between the camera main body and the illumination apparatus 100, a terminal MOSI_S that transmits data from the camera main body to the illumination apparatus 100, and a terminal MISO_S that receives data transmitted from the illumination apparatus 100. The terminals 116 also include a ground (GND) terminal that joins both the camera main body and the illumination apparatus 100. Near the terminals 116, an engagement portion (not illustrated) that engages with the camera main body is provided.

A cooling unit or circuit 117 is a module including a fan for cooling the optical panel 111 and is connected to a terminal FAN_PWM and a terminal FAN_FG of the microcomputer 101. The cooling unit 117 can change the number of revolutions of the fan under pulse-width modulation (PWM) control of the microcomputer 101 and change the air volume to be output. The cooling unit 117 can also maintain the number of revolutions according to a rotation instruction by feeding back number-of-revolutions information to the microcomputer 101.

Figure 3:
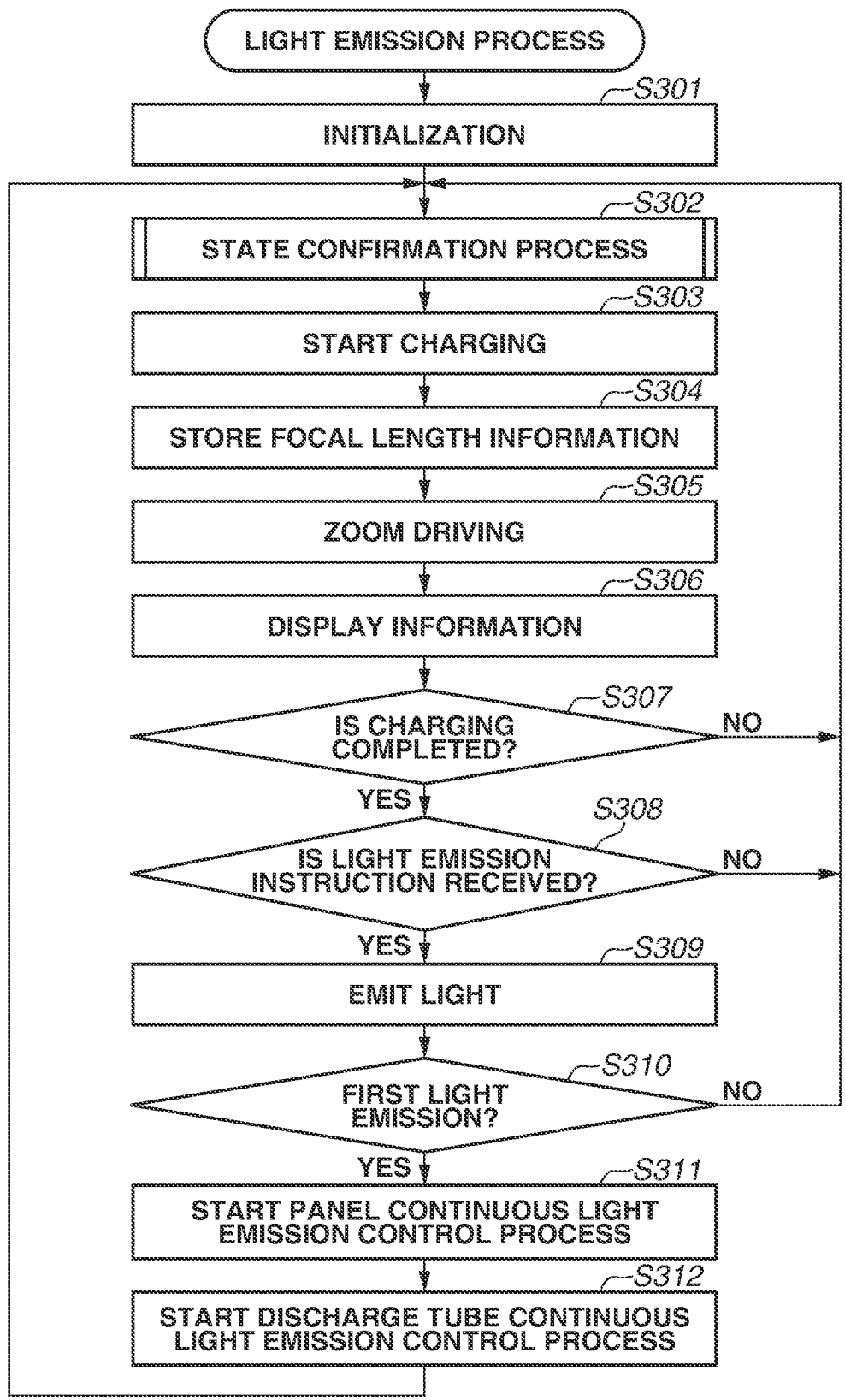
FIG. 3 is a flowchart for a light emission process performed by the illumination apparatus according to the first exemplary embodiment of the present disclosure.

Next, with reference to FIG. 3, a description is given of a light emission process performed by the illumination apparatus 100 according to the present exemplary embodiment. This processing is executed by the CPU included in the microcomputer 101 reading a program held in the ROM included in the microcomputer 101. The program includes instructions that, when executed by the CPU, cause the CPU to perform operations as functional units described in the following.

If the power switch included in the input unit 113 is turned on and the microcomputer 101 of the illumination apparatus 100 becomes operable, the microcomputer 101 starts a light emission process illustrated in a flowchart in FIG. 3.

In step S301, the microcomputer 101 initializes the memories and the ports of the microcomputer 101. The microcomputer 101 also reads the states of the switches included in the input unit 113 and input information set in advance and sets various light emission modes such as the manner of determining the light emission amount, and the light emission timing, and the processing proceeds to step S302.

In step S302, the microcomputer 101 stores the result of confirmation in a state confirmation process in the RAM of the microcomputer 101, and the processing proceeds to step S303. The details of the state confirmation process will be described below with reference to a flowchart in FIG. 4.

In step S303, the microcomputer 101 causes the voltage boost circuit block 102 to start operating, thereby charging the main capacitor 102*d*. After the charging of the main capacitor 102*d* is started, the processing proceeds to step S304.

In step S304, the microcomputer 101 acquires focal length information regarding the imaging lens from the camera main body via the terminals 116 and stores the acquired focal length information in the RAM included in the microcomputer 101. Then, the processing proceeds to step S305. If the focal length information is already stored in the RAM, the microcomputer 101 updates the focal length information in the RAM to the focal length information newly acquired in step S304.

In step S305, the microcomputer 101 causes the zoom driving circuit 115 to move the reflective umbrella unit 112 so that the light distribution angle of light emitted from the illumination apparatus 100 is in a range according to the focal length information acquired in step S304. Then, the processing proceeds to step S306. If it is not necessary to move the reflective umbrella unit 112, the processing immediately proceeds to step S306.

In step S306, the microcomputer 101 displays an image regarding the light emission modes set using the input unit 113 in step S301 and an image regarding the focal length information acquired in step S304 on the display unit 114. If it is detected in the state confirmation process in step S302 that an error state occurs in any of pieces of hardware related to a continuous light emission process, the microcomputer 101 displays a warning according to the content of the error. Then, the processing proceeds to step S307.

In step S307, based on a voltage input to the A/D conversion terminal MCV_AD, the microcomputer 101 confirms whether the charging of the main capacitor 102*d* is completed. If the charging is completed (YES in step S307), the microcomputer 101 transmits a charging completion signal to a camera microcomputer (not illustrated) of the camera main body via the terminals 116, and the processing proceeds to step S308. If the charging is not completed (NO in step S307), the processing returns to step S302.

In step S308, the microcomputer 101 determines whether a light emission start signal is received as a light emission instruction from the camera microcomputer. If a light emission start signal is received (YES in step S308), the processing proceeds to step S309. If a light emission start signal is not received (NO in step S308), the processing returns to step S302.

In step S309, according to the received light emission start signal, the microcomputer 101 gives a light emission instruction to the light emission control circuit 105. According to the light emission instruction, the light emission control circuit 105 causes the discharge tube 104 to emit light. After the light emission ends, the microcomputer 101 stores information regarding the light emission, such as voltage information regarding the main capacitor 102*d*, in the RAM included in the microcomputer 101, and the processing proceeds to step S310. In a case where a series of light emission operations such as pre-light emission for light adjustment and main light emission is performed, the processing proceeds to step S310 after the series of light emission operations is completed in step S309.

In step S310, the microcomputer 101 determines whether the light emission in step S309 is the first light emission, i.e., light emission performed for the first time after the light emission process in FIG. 3 starts. If the light emission in step S309 is the first light emission (YES in step S310), the processing proceeds to step S311. If the light emission in step S309 is the second or subsequent light emission (NO in step S310), the processing returns to step S302. In a case where a series of light emission operations such as pre-light emission for light adjustment and main light emission is performed, and if light is not emitted before the series of light emission operations is performed, it is considered that the light emission in step S309 is the first light emission.

In step S311, the microcomputer 101 starts a panel continuous light emission control process for controlling light emission and charging so that even if heat generated by light emission continues to be applied to the optical panel 111 by continuous light emission, the temperature of the optical panel 111 does not excessively rise. Then, the processing proceeds to step S312. The details of the panel continuous light emission control process will be described below with reference to a flowchart in FIG. 5.

In step S312, the microcomputer 101 starts a discharge tube continuous light emission control process for controlling light emission and charging so that even if heat generated by light emission continues to be applied to the discharge tube 104 by continuous light emission, the temperature of the discharge tube 104 does not excessively rise. Then, the processing returns to step S302. The details of the discharge tube continuous light emission control process will be described below with reference to a flowchart in FIG. 6.

Figure 5:
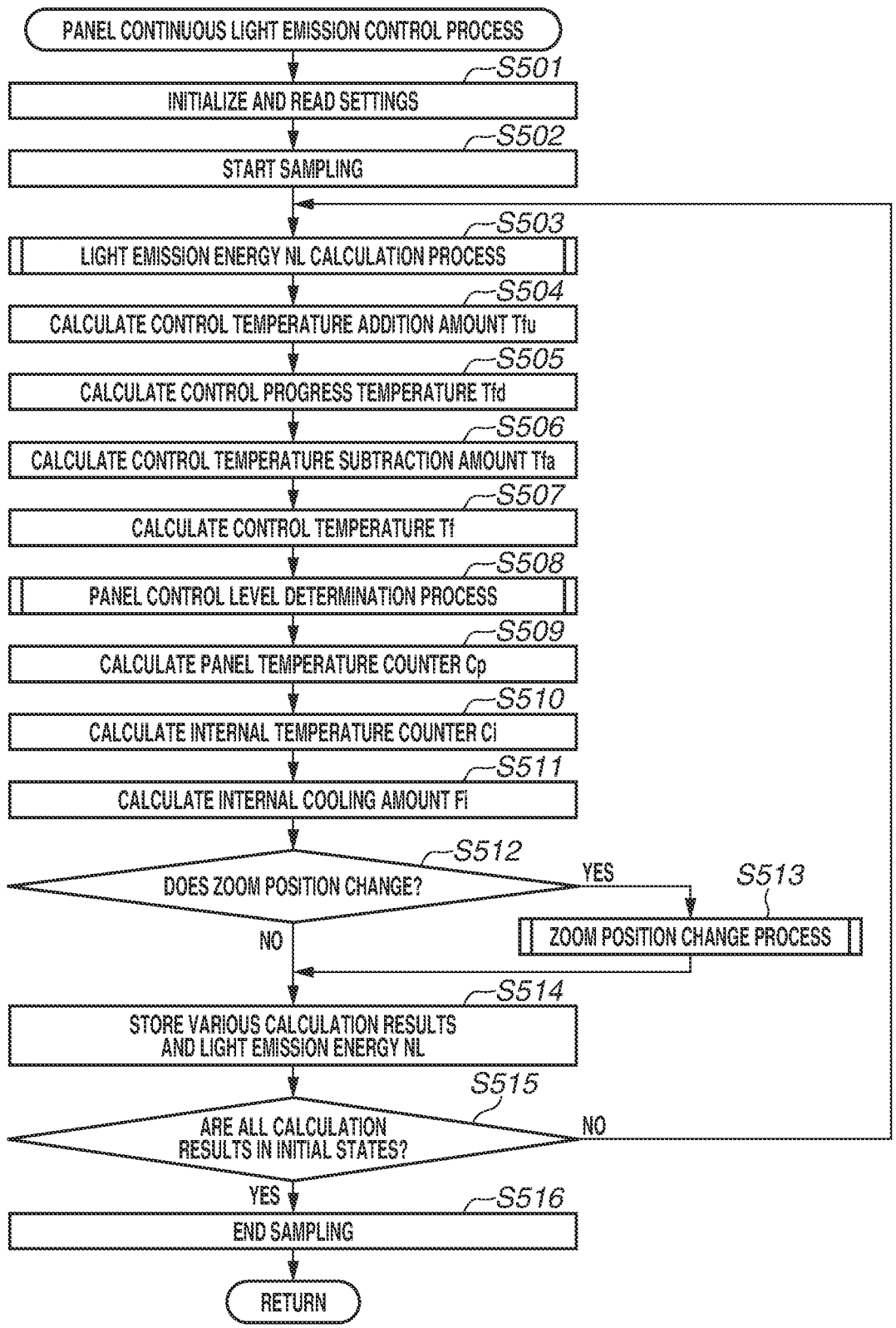
FIG. 5 is a flowchart for a panel continuous light emission control process in step S311 in FIG. 3 according to the first exemplary embodiment of the present disclosure.
Figure 6:
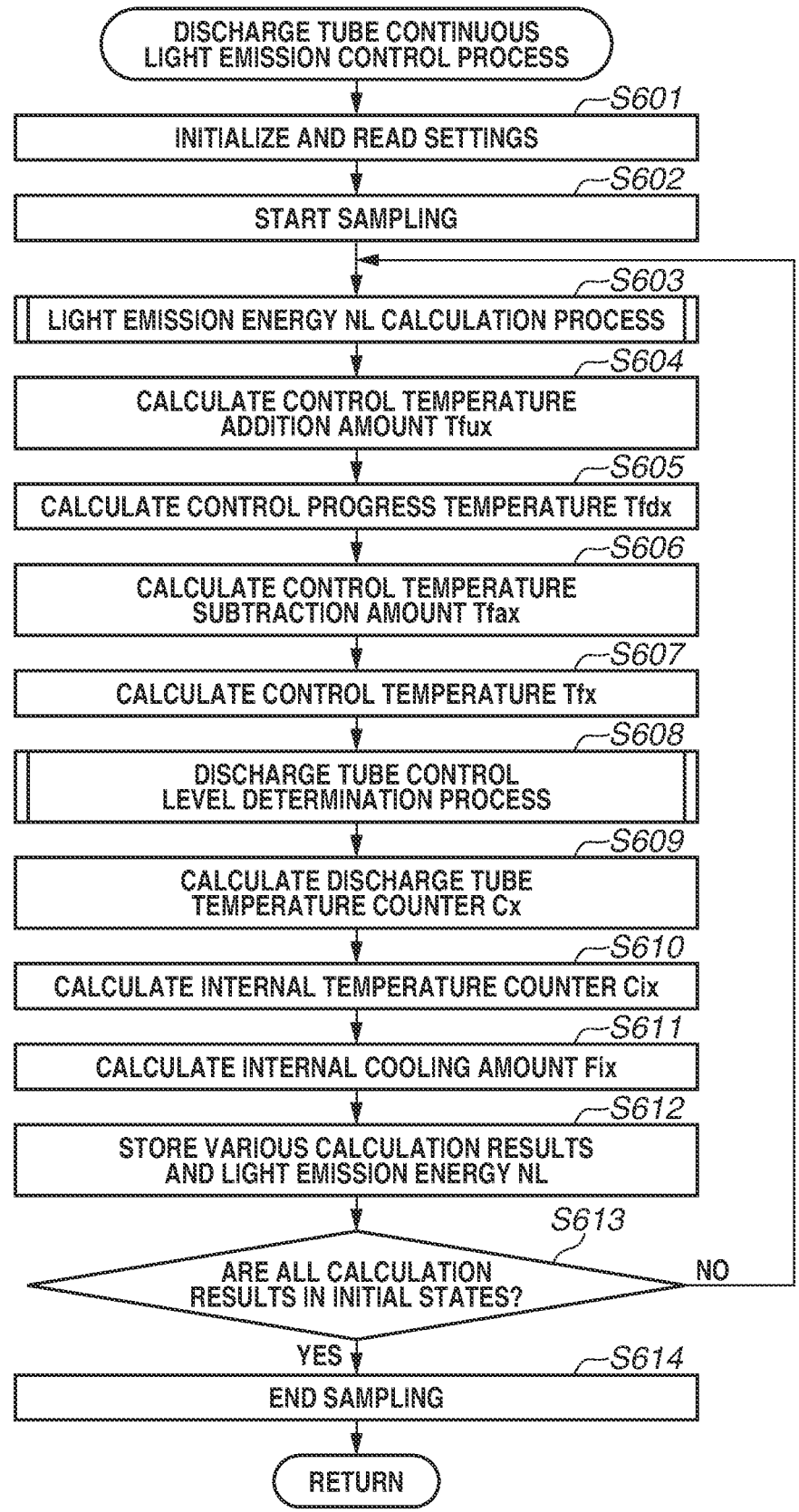
FIG. 6 is a flowchart for a discharge tube continuous light emission control process in step S312 in FIG. 3 according to the first exemplary embodiment of the present disclosure.

In the continuous light emission control processes in steps S311 and S312, if the calculation results of control temperatures Tf and Tfx and other parameters are not in the initial states, the control temperatures Tf and Tfx and the other parameters are repeatedly calculated, and if the calculation results are back in the initial states, the continuous light emission control processes in steps S311 and S312 end. That is, to protect the optical panel 111 and the discharge tube 104 from the influence of heat generated by the light emission in step S309, the calculations of assumed temperatures of the optical panel 111 and the discharge tube 104 or counters as substitutes for the assumed temperatures are started after the first light emission ends. Then, until the calculation results of the counters are the same as the initial states due to a lapse of time with heat dissipation or a reset process, the continuous light emission control processes in FIGS. 5 and 6 are continued in parallel with the light emission process in FIG. 3. Although the processes in FIGS. 5 and 6 are continuous light emission control process in the present exemplary embodiment, a similar process may be performed for a single light emission operation. After the continuous light emission control processes are thus started, the processing returns to step S302.

Figure 4:
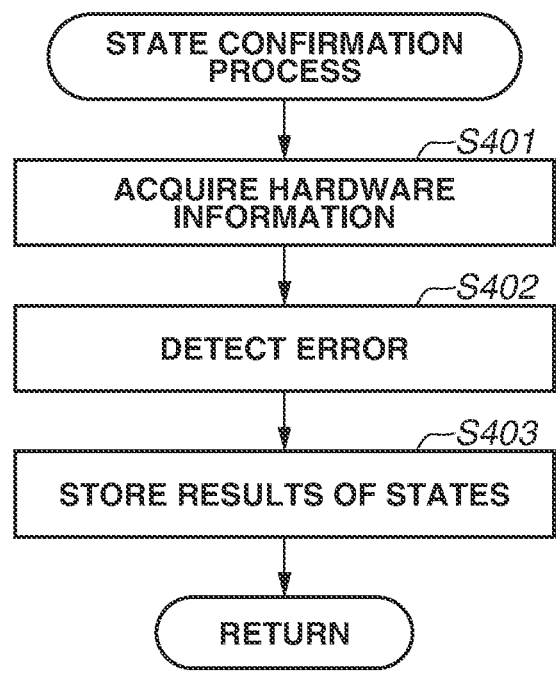
FIG. 4 is a flowchart for a state confirmation process in step S302 in FIG. 3 according to the first exemplary embodiment of the present disclosure.

Next, with reference to a flowchart in FIG. 4, a description is given of the state confirmation process (step S302) performed by the illumination apparatus 100. This processing is executed to confirm the state of hardware (target hardware) related to the panel continuous light emission control process. The "target hardware" refers to a member that influences an optical system or a heat source. Specifically, examples of the target hardware include the cooling unit 117 that cools the optical panel 111, and optical accessories (not illustrated) such as a color filter and a bounce adapter attached in front of the optical panel 111. Examples of the target hardware may also include an external power supply (not illustrated) that accelerates the charging of the main capacitor 102d, and a modeling light-emitting diode (LED) (not illustrated) that facilitates the grasp of the optical axis of light emitted from the optical panel 111.

In step S401, the microcomputer 101 acquires state information regarding the target hardware. The state information includes information indicating whether each of the pieces of target hardware is mounted on or connected to the illumination apparatus 100, and the setting of whether each of the pieces of target hardware is operable that is made using the input unit 113. The state information is updated together with error information every time the state of the target hardware changes. The microcomputer 101 stores the acquired state information regarding the target hardware related to the panel continuous light emission control process in the RAM included in the microcomputer 101, and the processing proceeds to step S402.

In step S402, based on the state information regarding the target hardware acquired in step S401, the microcomputer 101 detects whether the target hardware itself is in an error state. For example, there is a case where, even though the cooling unit 117 is connected to the illumination apparatus 100 and the cooling unit 117 is operable in the settings of the light emission modes made in step S301, the cooling unit 117 is inoperable due to a failure. In this case, the microcomputer 101 detects that the cooling unit 117 itself as the target hardware is in an error state. As a result of the detection, if the target hardware itself is in an error state, the microcomputer 101 acquires information indicating that the target hardware itself is in an error state as error information in the RAM included in the microcomputer 101. Then, the processing proceeds to step S403.

In step S403, the microcomputer 101 stores the information acquired in steps S401 and S402 in the RAM included in the microcomputer 101, and this processing ends.

Next, with reference to a flowchart in FIG. 5, a description is given of the panel continuous light emission control process (step S311) performed by the illumination apparatus 100. In this processing, a process for reducing the temperature rise in the optical panel 111 under the influence of heat generated by light emission from the discharge tube 104 is performed. Specifically, a numerical value that enables the relative evaluation of the temperature of the optical panel 111 is calculated as an assumed panel temperature, and based on the calculation result of the assumed panel temperature, a light emission interval and a charging current are controlled. If the discharge tube 104 emits light for the first time in step S309 in FIG. 3, the microcomputer 101 starts this processing in parallel with the light emission process in FIG. 3.

In step S501, the microcomputer 101 initializes settings regarding continuous light emission control.

The microcomputer 101 reads input information and parameters set in advance, and the processing proceeds to step S502. If the input information and the parameters are already read in step S301 in FIG. 3, this step may be omitted.

In step S502, the microcomputer 101 starts sampling for controlling continuous light emission. Every time a predetermined sampling time elapses, calculations in steps S503 to S511 are performed. In the following description, the calculations in a single sampling event are described. Until the calculation results are the same as the initial states due to a lapse of time with heat dissipation or a reset process, the calculations are repeated every time the predetermined sampling time elapses. After the sampling is started, the processing proceeds to step S503.

In step S503, the microcomputer 101 performs a light emission energy NL calculation process for calculating light emission energy NL with which light is emitted during this sampling. The light emission energy NL is calculated based on voltage information regarding the main capacitor 102d, light emission value information regarding the discharge tube 104 that is obtained from the photodiode 106, or light emission command information from the camera main body. The details of the light emission energy NL calculation process will be described below with reference to a flowchart in FIG. 7. After the light emission energy NL is calculated, the microcomputer 101 stores the light emission energy NL in the RAM included in the microcomputer 101, and the processing proceeds to step S504.

Figure 11:
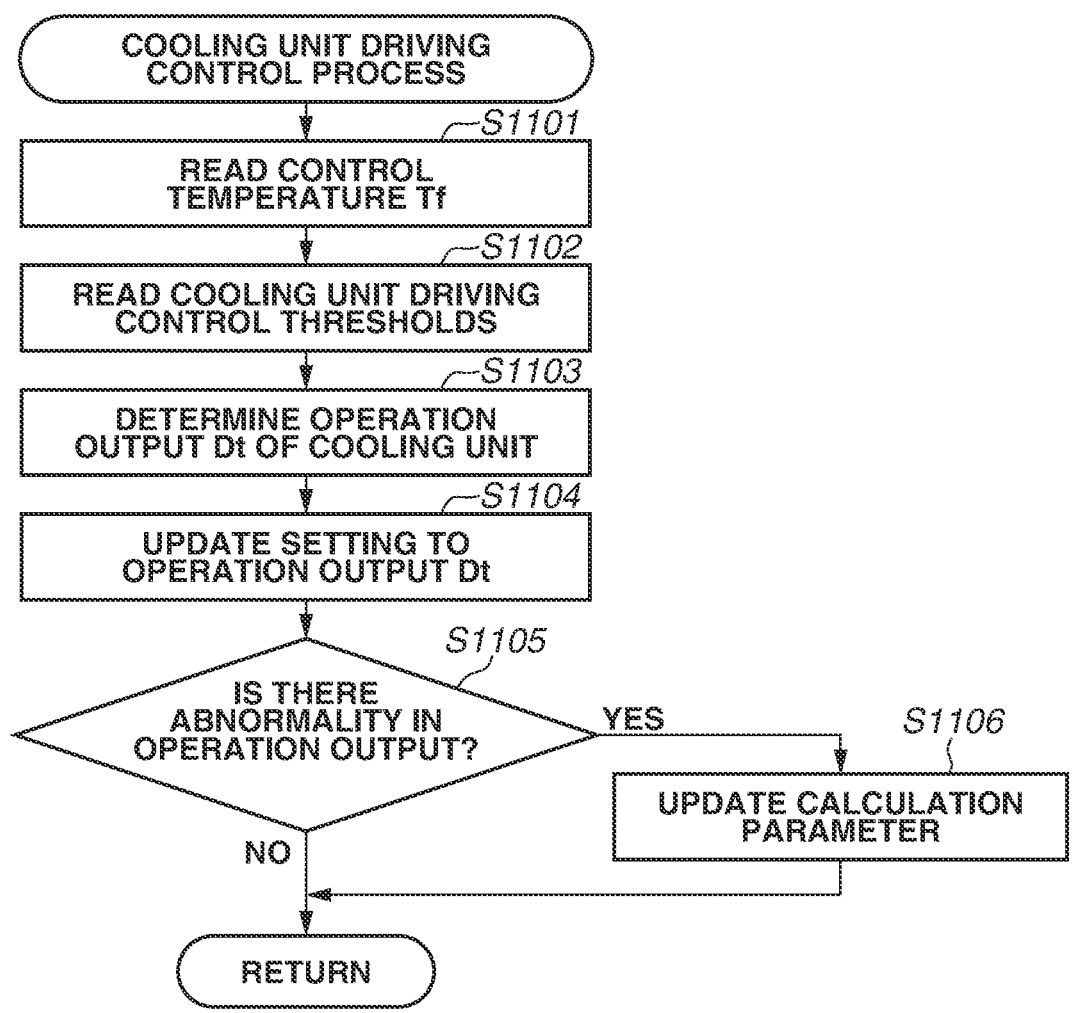
FIG. 11 is a flowchart for a cooling unit driving control process executed every time a control temperature is calculated in step S507 in FIG. 5.

In step S504, the microcomputer 101 calculates a control temperature addition amount Tfu. The control temperature addition amount Tfu will be described below. After the control temperature addition amount Tfu is calculated, the microcomputer 101 stores the calculation result in the RAM included in the microcomputer 101, and the processing proceeds to step S505. In step S505, the microcomputer 101 calculates a control progress temperature Tfd. The control progress temperature Tfd will be described below. After the control progress temperature Tfd is calculated, the microcomputer 101 stores the calculation result in the RAM included in the microcomputer 101, and the processing proceeds to step S506. In step S506, the microcomputer 101 calculates a control temperature subtraction amount Tfa. The control temperature subtraction amount Tfa will be described below. After the control temperature subtraction amount Tfa is calculated, the microcomputer 101 stores the calculation result in the RAM included in the microcomputer 101, and the processing proceeds to step S507. In step S507, the microcomputer 101 calculates a control temperature Tf. The control temperature Tf will be described below. After the control temperature Tf is calculated, the microcomputer 101 stores the calculation result in the RAM included in the microcomputer 101, and the processing proceeds to step S508. Every time the control temperature Tf is calculated in step S507, a cooling unit driving control process illustrated in FIG. 11 is executed.

In step S508, the microcomputer 101 performs a panel control level determination process. A "control level" refers to a level for setting the shortest light emission interval when the illumination apparatus 100 continuously emits light. A plurality of levels including a warning level that is the highest control level is provided. Then, a setting is made so that as the control level increases, the shortest light emission interval increases. The details of the panel control level determination process will be described below with reference to a flowchart in FIG. 9. After the panel control level determination process, the microcomputer 101 stores the determination result in the RAM included in the microcomputer 101, and the processing proceeds to step S509.

In step S509, the microcomputer 101 calculates a panel temperature counter Cp. The panel temperature counter Cp will be described below. After the panel temperature counter Cp is calculated, the microcomputer 101 stores the calculation result in the RAM included in the microcomputer 101, and the processing proceeds to step S510. In step S510, the microcomputer 101 calculates an internal temperature counter Ci. The internal temperature counter Ci will be described below. After the internal temperature counter Ci is calculated, the microcomputer 101 stores the calculation result in the RAM included in the microcomputer 101, and the processing proceeds to step S511. In step S511, the microcomputer 101 calculates an internal cooling amount Fi. The internal cooling amount Fi will be described below. After the internal cooling amount Fi is calculated, the microcomputer 101 stores the calculation result in the RAM included in the microcomputer 101, and the processing proceeds to step S512.

In step S512, the microcomputer 101 compares the zoom position when the last light emission is performed in this sampling and the zoom position when the previous sampling is performed. As a result of the comparison, if the zoom position does not change (NO in step S512), the processing proceeds to step S514. Further, if a zoom position change process in step S513 is executed in the previous sampling and a bit indicating that the zoom position is changed is set, the bit is lowered. On the other hand, as a result of the comparison in step S512, if the zoom position changes (YES in step S512), the processing proceeds to step S513.

In step S513, the microcomputer 101 performs the zoom position change process. The details of the zoom position change process will be described below with reference to a flowchart in FIG. 10. After the zoom position change process, the microcomputer 101 stores the result in the RAM included in the microcomputer 101, and the processing proceeds to step S514. In step S514, the microcomputer 101 stores the various calculation results and the light emission energy NL in the RAM included in the microcomputer 101. Then, the processing proceeds to step S515. If the various calculation results and the light emission energy NL are already stored in the RAM, this step may be omitted.

In step S515, the microcomputer 101 confirms whether the calculation results of the control temperature Tf and the other parameters are back in the initial states set in step S501. If the calculation results are back in the initial states (YES in step S515), the processing proceeds to step S516. If the calculation results are not in the initial states (NO in step S515), the processing returns to step S503. In step S503, the microcomputer 101 starts next sampling. In step S516, the microcomputer 101 ends the sampling started in step S502, and this processing ends.

Next, with reference to a flowchart in FIG. 6, a description is given of the discharge tube continuous light emission control process (step S312) performed by the illumination apparatus 100. In this processing, a process for reducing the temperature rise in the discharge tube 104 under the influence of heat generated by light emission from the discharge tube 104 is performed. Specifically, a numerical value that enables the relative evaluation of the temperature of the discharge tube 104 is calculated as an assumed discharge tube temperature, and based on the calculation result of the assumed discharge tube temperature, a light emission interval and a charging current are controlled. If the discharge tube 104 emits light for the first time in step S309 in FIG. 3, the microcomputer 101 starts this processing in parallel with the light emission process in FIG. 3 and the panel continuous light emission control process in FIG. 5.

In step S601, the microcomputer 101 initializes settings regarding continuous light emission control.

The microcomputer 101 reads input information and parameters set in advance, and the processing proceeds to step S602. If the input information and the parameters are already read in step S301 in FIG. 3, this step may be omitted.

In step S602, the microcomputer 101 starts sampling for controlling continuous light emission. Every time a predetermined sampling time elapses, calculations in step S603 to S612 are performed. In the following description, the calculations in a single sampling event are described. Until the calculation results are the same as the initial states due to a lapse of time with heat dissipation or a reset process, the calculations are repeated every time the predetermined sampling time elapses. After the sampling is started, the processing proceeds to step S603. In step S603, the microcomputer 101 performs a light emission energy NL calculation process for calculating light emission energy NL with which light is emitted during this sampling. This process is similar to that of step S503, and may be omitted if step S503 is executed. After the light emission energy NL is calculated, the microcomputer 101 stores the light emission energy NL in the RAM included in the microcomputer 101, and the processing proceeds to step S604.

In step S604, the microcomputer 101 calculates a control temperature addition amount Tfux. The control temperature addition amount Tfux will be described below. After the control temperature addition amount Tfux is calculated, the microcomputer 101 stores the calculation result in the RAM included in the microcomputer 101, and the processing proceeds to step S605. In step S605, the microcomputer 101 calculates a control progress temperature Tfdx. The control progress temperature Tfdx will be described below. After the control progress temperature Tfdx is calculated, the microcomputer 101 stores the calculation result in the RAM included in the microcomputer 101, and the processing proceeds to step S606. In step S606, the microcomputer 101 calculates a control temperature subtraction amount Tfax. The control temperature subtraction amount Tfax will be described below. After the control temperature subtraction amount Tfax is calculated, the microcomputer 101 stores the calculation result in the RAM included in the microcomputer 101, and the processing proceeds to step S607. In step S607, the microcomputer 101 calculates a control temperature Tfx. The control temperature Tfx will be described below. After the control temperature Tfx is calculated, the microcomputer 101 stores the calculation result in the RAM included in the microcomputer 101, and the processing proceeds to step S608.

In step S608, the microcomputer 101 performs a discharge tube control level determination process. A "control level" refers to a level for setting the shortest light emission interval when the illumination apparatus 100 continuously emits light. A plurality of levels including a warning level that is the highest control level is provided. Then, a setting is made so that as the control level increases, the shortest light emission interval increases. The details of the discharge tube control level determination process will be described below with reference to a flowchart in FIG. 14. After the discharge tube control level determination process, the microcomputer 101 stores the determination result in the RAM included in the microcomputer 101, and the processing proceeds to step S609.

In step S609, the microcomputer 101 calculates a discharge tube temperature counter Cx. The discharge tube temperature counter Cx will be described below. After the discharge tube temperature counter Cx is calculated, the microcomputer 101 stores the calculation result in the RAM included in the microcomputer 101, and the processing proceeds to step S610. In step S610, the microcomputer 101 calculates an internal temperature counter Cix. The internal temperature counter Cix will be described below. After the internal temperature counter Cix is calculated, the microcomputer 101 stores the calculation result in the RAM included in the microcomputer 101, and the processing proceeds to step S611. In step S611, the microcomputer 101 calculates an internal cooling amount Fix. The internal cooling amount Fix will be described below. After the internal cooling amount Fix is calculated, the microcomputer 101 stores the calculation result in the RAM included in the microcomputer 101, and the processing proceeds to step S612. In step S612, the microcomputer 101 stores the various calculation results and the light emission energy NL in the RAM included in the microcomputer 101. Then, the processing proceeds to step S613. If the various calculation results and the light emission energy NL are already stored in the RAM, this step may be omitted.

In step S613, the microcomputer 101 confirms whether the calculation results of the control temperature Tfx and the other parameters are back in the initial states set in step S601. If the calculation results are back in the initial states (YES in step S613), the processing proceeds to step S614. If the calculation results are not in the initial states (NO in step S613), the processing returns to step S603. In step S603, the microcomputer 101 starts next sampling. In step S614, the microcomputer 101 ends the sampling started in step S602, and this processing ends.

In the discharge tube continuous light emission control process in FIG. 6, unlike the panel continuous light emission control process, the zoom position change process is omitted. This is because heat generated by the discharge tube 104 itself emitting light is less likely to be influenced by the zoom position. The zoom position change process, however, may be executed without omitting the zoom position change process also in the discharge tube continuous light emission control process.

Figure 7:
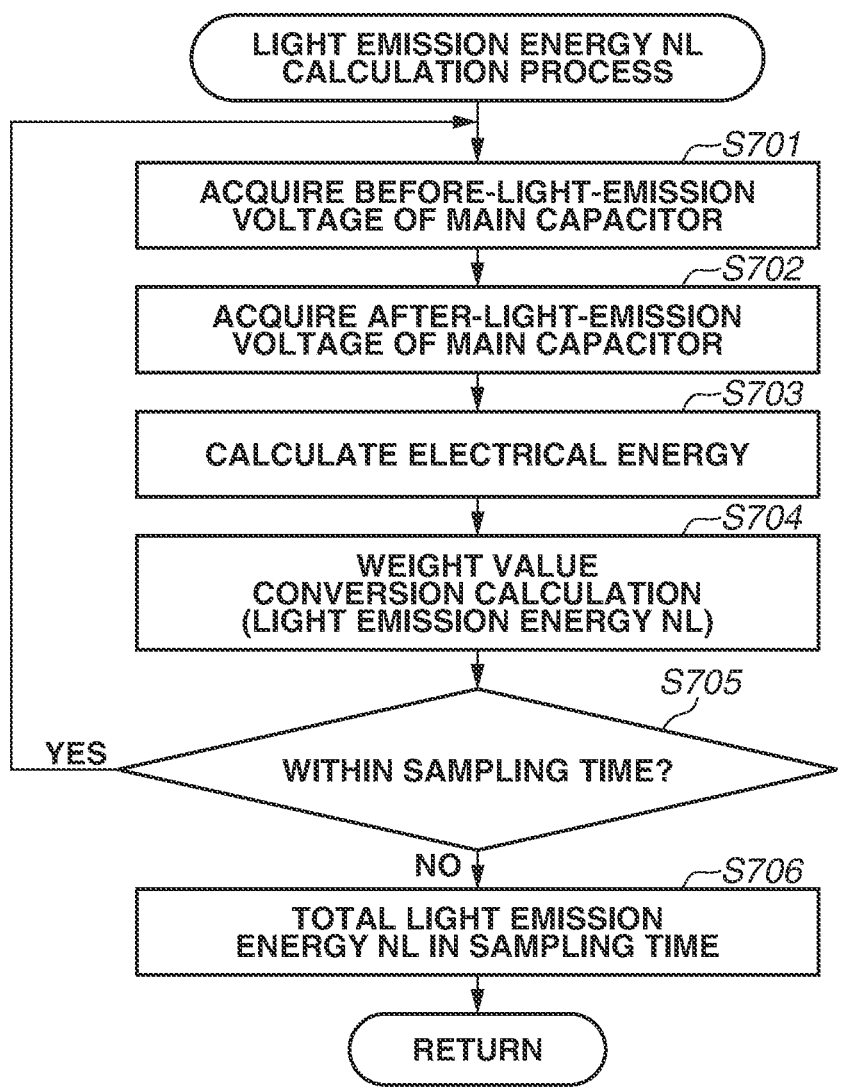
FIG. 7 is a flowchart for a light emission energy calculation process in step S503 in FIG. 5 according to the first exemplary embodiment of the present disclosure.

Next, with reference to a flowchart in FIG. 7, the light emission energy NL calculation process (steps S503 and S603) is described. In this processing, light emission energy NL is calculated from voltage information regarding the main capacitor 102*d*.

In step S701, the microcomputer 101 acquires information regarding a before-light-emission voltage bVCM from an A/D conversion value of the main capacitor 102*d*. After the before-light-emission voltage bVCM is acquired, the processing proceeds to step S702. In step S702, the microcomputer 101 acquires information regarding an after-light-emission voltage aVCM from the A/D conversion value of the main capacitor 102*d*. After the after-light-emission voltage aVCM is acquired, the processing proceeds to step S703.

In step S703, the microcomputer 101 calculates electrical energy EC using the before-light-emission voltage bVCM acquired in step S701 and the after-light-emission voltage aVCM acquired in step S702. The electrical energy EC is obtained by the following equation (1).

$$EC=(bVCM^2-aVCM^2)/Os \quad (1)$$

According to equation (1), the output range of the electrical energy EC is adjusted using gain Os. After the electrical energy EC is calculated, the processing proceeds to step S704.

In step S704, by weight value conversion, the microcomputer 101 calculates light emission energy NL for use in calculation expressions used in the panel continuous light emission control process and the discharge tube continuous light emission control process. The light emission energy NL is obtained by the following approximation equation (2) according to the configuration of the illumination apparatus 100.

$$NL=\alpha \times EC+\beta \quad (2)$$

Coefficients $\alpha$ and $\beta$ are adjusted based on measurement data. After the light emission energy NL is calculated, the microcomputer 101 stores the result in the RAM included in the microcomputer 101, and the processing proceeds to step S705.

In step S705, the microcomputer 101 determines whether this sampling is continuing (the current time is within this sampling time) or ends. If this sampling is continuing (YES in step S705), the processing returns to step S701. If this sampling ends (NO in step S705), the processing proceeds to step S706.

In step S706, the microcomputer 101 totals the light emission energy NL with which light is emitted in this sampling time, and updates the light emission energy NL. In a case where light is emitted a plurality of times (z times) in this sampling time, and if the light emission energy NL calculated in step S704 at each time is NL1, NL2, . . . , NLz, the updated light emission energy NL is obtained by the following equation (3).

$$NL=NL1+NL2+NL3+ \ldots NLz \quad (3)$$

In the calculation of the light emission energy NL, although pre-light emission and main light emission are treated as a series of light emission operations in step S309, the light emission energy NL is totaled using equation (3) by also regarding pre-light emission as individual light emission. If light is not emitted in the sampling time, the value of the light emission energy NL totaled in step S706 is 0. After the light emission energy NL is updated, the microcomputer 101 stores the result in the RAM included in the microcomputer 101, and the light emission energy NL calculation process ends. Then, the processing proceeds to step S504.

Figure 8A:
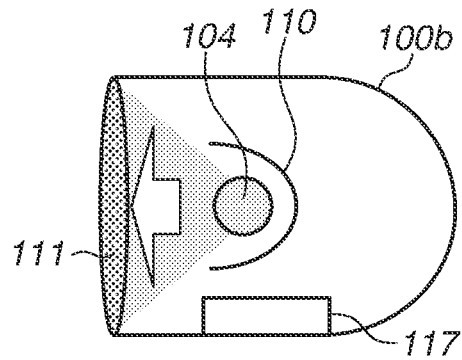
FIGS. 8A to 8F are diagrams illustrating heat transfer models of a light-emitting unit of the illumination apparatus according to the first exemplary embodiment of the present disclosure.
Figure 8B:
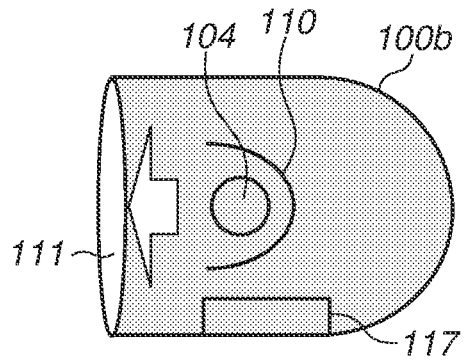
Figure 8C:
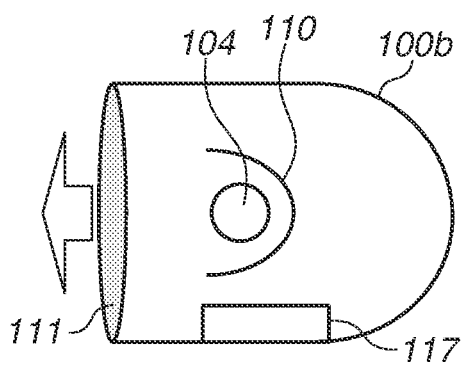
Figure 8D:
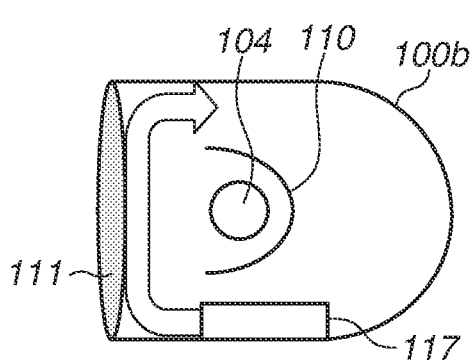
Figure 8E:
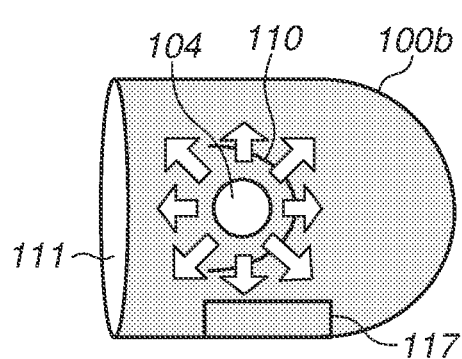
Figure 8F:
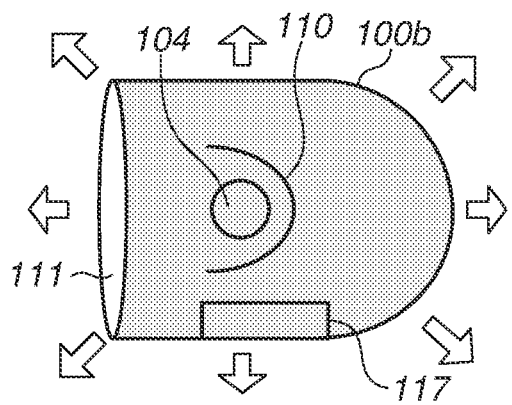

Next, with reference to FIGS. 8A to 8F, a description is given of various calculation expressions (steps S504 to S507 and steps S509 to S511) used in the panel continuous light emission control process in FIG. 5. FIGS. 8A to 8F are diagrams illustrating heat transfer models of the light-emitting unit 100b. FIG. 8A is a diagram illustrating heat radiation to the optical panel 111 when the discharge tube 104 emits light. FIG. 8B is a diagram illustrating heat transmission from the internal space of the heated light-emitting unit 100b to the optical panel 111 after the discharge tube 104 emits light. FIG. 8C is a diagram illustrating heat transmission when the heated optical panel 111 dissipates heat to the external space after the discharge tube 104 emits light. FIG. 8D is a diagram illustrating heat transmission when the optical panel 111 heated by the light emission from the discharge tube 104 dissipates heat by the cooling unit 117 sending air to the optical panel 111. FIG. 8E is a diagram illustrating heat transmission to the internal space of the light-emitting unit 100b when the discharge tube 104 emits light. FIG. 8F is a diagram illustrating heat transmission when the internal space of the heated light-emitting unit 100b dissipates heat to the external space through the exterior of the heated light-emitting unit 100b.

First, as illustrated in FIG. 8A, the optical panel 111 is heated by heat radiation when the discharge tube 104 emits light. If this amount of heat is a radiation heating amount Rh, the radiation heating amount Rh is obtained by the following equation (4), using the light emission energy NL.

$$Rh = NL/Rhc \qquad (4)$$

Rhc represents a radiation heating coefficient. The optical panel effective range of the optical panel 111 and the influence of heat radiation from the discharge tube 104 on the optical panel 111 differ with respect to each zoom position. Thus, the radiation heating amount Rh is obtained by setting the radiation heating coefficient Rhc with respect to each zoom position.

As illustrated in FIG. 8B, after the discharge tube 104 emits light, heat transmission from the internal space of the heated light-emitting unit 100b to the optical panel 111 occurs with a time lag from the time when the above heat radiation occurs. If the amount of this heat transmission is a heat transmission heating amount Hh, the heat transmission heating amount Hh is obtained by the following equation (5).

$$Hh = (preCi - preCp)/Hhc \qquad (5)$$

Ci represents an internal temperature counter, and Cp represents a panel temperature counter. The prefix "pre" indicates the result of calculation in a sampling time one or more times before this sampling time. Hhc represents a heat transmission coefficient when the heat of the internal space of the light-emitting unit 100b is transmitted to the optical panel 111.

As illustrated in FIG. 8C, the optical panel 111 is heated and also dissipates heat at the same time.

If the amount of heat dissipated from the optical panel 111 to the external space is a panel heat dissipation amount Fp, the panel heat dissipation amount Fp is obtained by the following equation (6).

$$Fp = (preCp - preT)/Fhc \qquad (6)$$

T represents an ambient temperature or a counter as a substitute for the ambient temperature. Fhc represents a heat transmission coefficient when the optical panel 111 dissipates heat.

As illustrated in FIG. 8D, the optical panel 111 is cooled by the cooling unit 117 sending air to the optical panel 111.

If the amount of heat by which the optical panel 111 is forcibly cooled by the cooling unit 117 is a forcible cooling heat amount Ap, the forcible cooling heat amount Ap is obtained by the following equation (7).

$$Ap = (Af \times Dt \times Afc)/Fhc \qquad (7)$$

Af represents a cooling flow rate, Dt represents an operation output, and Afc represents a conversion coefficient. Normally, heat conduction with the exterior is also included in addition to the above, but is omitted in the present exemplary embodiment because the contact area is small and the heat conduction is sufficiently small for heat transfer when the discharge tube 104 emits light.

Next, the internal temperature counter Ci illustrated in equation (5) is obtained.

As illustrated in FIG. 8E, the internal space of the light-emitting unit 100b is heated by heat transmission when the discharge tube 104 emits light. If this amount of heat is a heat generation amount Hv, the heat generation amount Hv is obtained by the following equation (8), using the light emission energy NL.

$$Hv = (NL \times CS)/Cic \qquad (8)$$

Cic represents an internal temperature coefficient and is a conversion coefficient for conversion from the light emission energy NL to the heat generation amount Hv. CS represents conversion gain and has the function of adjusting a shift in conversion to the heat generation amount Hv, which changes according to the temperature of the internal space of the light-emitting unit 100b.

As illustrated in FIG. 8F, the internal space of the heated light-emitting unit 100b dissipates heat. If the amount of heat dissipated to the external space through the exterior is an internal cooling amount Fi, the internal cooling amount Fi is obtained by the following equation (9).

$$Fi = (preCi - preT)/Fic \qquad (9)$$

Fic represents an internal cooling coefficient.

The internal temperature counter Ci illustrated in equation (5) is obtained by the following equation (10).

$$Ci = preCi + preHv - preFi - preAp/Cr \qquad (10)$$

Ap represents a forcible cooling heat amount, and Cr represents the ratio of contribution of preAP to the internal temperature counter Ci.

The panel temperature counter Cp illustrated in equation (5) is obtained by the following equation (11).

$$Cp = preCp + Rh + Hh - Fp - Ap \qquad (11)$$

Consequently, the heat transmission heating amount Hh can be obtained by equation (5).

Next, an assumed temperature of the optical panel 111 (hereinafter referred to as an "assumed panel temperature") that is assumed is calculated using the panel temperature counter Cp obtained by equation (11) and the ambient temperature T. If the assumed panel temperature is Tps, the assumed panel temperature Tps is obtained by the following equation (12).

$$Tps = T + Cp/Tc \qquad (12)$$

Tc represents a temperature conversion coefficient. If the ambient temperature T is found, the assumed panel temperature Tps at this time can be obtained by equation (12). The present exemplary embodiment assumes the achievement of continuous light emission control while reducing costs without using a known temperature sensor. Moreover, to simplify the control, the subsequent calculations are performed on the assumption that T=0.

If equation (12) is developed and organized to perform the calculations regarding the continuous light emission control process, the following equation (13) is obtained.

$$Tf=NL/(Rhc \times Tc)+(1/Tc-2/(Hhc \times Tc)) \times preCp+preCi/(Hhc \times Tc)-(Af \times Dt \times Afc)/(Hhc \times Tc) \quad (13)$$

(Because Tf=Tps−T, Hhc=Fhc, T=0)

Tf represents a control temperature, is the relative temperature of the optical panel 111, also has the role of a light emission counter, and is used in a determination for control described below. If the first term on the right side of equation (13) is a control temperature addition amount Tfu, the second and third terms on the right side of equation (13) are a control progress temperature Tfd, and the fourth term on the right side of equation (13) is a control temperature subtraction amount Tfa, the following equation (14) is obtained.

$$\begin{cases} Tfu = NL/(Rhc \times Tc) \\ Tfd = (1/Tc - 2/(Hhc \times Tc)) \times preCp + preCi/(Hhc \times Tc) \\ Tfa = (Af \times Dt \times Afc)/(Hhc \times Tc) \\ Tf = Tfu + Tfd - Tfa \end{cases} \quad (14)$$

The control temperature addition amount Tfu represents the heat generation of the optical panel 111 due to heat radiation in this sampling. The control progress temperature Tfd represents the temperature of the optical panel 111 (the assumed panel temperature) in this sampling that is assumed from the calculation results in the previous sampling. The control temperature subtraction amount Tfa represents the cooling heat amount by which the optical panel 111 is cooled by the cooling unit 117 in this sampling. The control progress temperature Tfd includes the panel temperature counter preCp in the previous sampling and the internal temperature counter preCi in the previous sampling. Thus, based on the flowchart in FIG. 5, the calculations in a single sampling event can be completed by the following three equations (15), (16), and (17).

preCp' represents a panel temperature counter in the next sampling, and preCi' represents an internal temperature counter in the next sampling.

$$preCp'=(1-2/Hhc) \times preCp+preCi/Hhc+NL/Rhc-(Af \times Dt \times Afc)/Hhc \quad (15)$$

$$preCi'=preCi+(preNL \times CS)/Cic-preFi-(Af \times preDt \times Afc)/(Hhc \times Cr) \quad (16)$$

$$preFi=preCi/Fic \quad (17)$$

preCp' and preCi' calculated by equations (15) and (16) are fed back as preCp and preCi after the conversion process to the next sampling.

These are the calculation equations used in the panel continuous light emission control process. That is, calculations are performed using the first equation of equation (14) in step S504, the second equation of equation (14) in step S505, the third equation of equation (14) in step S506, and the fourth equation of equation (14) in step S507. Moreover, calculations are performed using equation (15) in step S509, equation (16) in step S510, and equation (17) in step S511. By equations (15) to (17), the panel temperature counter, the internal temperature counter, and the internal cooling heat amount, respectively, to be fed back to the next sampling are calculated. Consequently, it is possible to calculate the assumed panel temperature based on a heat dissipation time, a blast volume determined according to the operation output Dt of the cooling unit 117 and the corresponding cooling flow rate Af, and a temperature difference in the optical panel 111 and the internal space of the light-emitting unit 100b.

Next, with reference to a flowchart in FIG. 9, a description is given of the control level determination process (step S508) in the panel continuous light emission control process.

In step S901, the microcomputer 101 acquires from the zoom detection unit 115a the zoom position when light is emitted in this sampling. After the microcomputer 101 stores the result in the RAM included in the microcomputer 101, the processing proceeds to step S902. In step S902, the microcomputer 101 reads a plurality of determination thresholds set corresponding to the zoom position acquired in step S901 from the RAM included in the microcomputer 101, and the processing proceeds to step S903. The plurality of determination thresholds indicates the minimum temperatures at different control levels.

In step S903, the microcomputer 101 determines a control level based on the control temperature Tf obtained in step S507 and the determination thresholds read in step S902. Specifically, in order from the control level corresponding to the highest temperature, the microcomputer 101 compares whether the control temperature Tf exceeds the determination threshold. As a result of the comparison, if the control temperature Tf exceeds the determination threshold, the microcomputer 101 determines that the control level is a control level at which the exceeded determination threshold is the minimum temperature. Then, after the microcomputer 101 stores the determined control level in the RAM included in the microcomputer 101, the processing proceeds to step S904. In the control process based on the control level, if the electrical energy EC obtained in step S703 or the light emission energy NL obtained in step S704 exceeds any threshold, the microcomputer 101 performs control for delaying the next determination of whether the charging is completed (step S307) for any time after the light emission operation.

In step S904, the microcomputer 101 updates the current control level to the control level determined in step S903 and updates related parameters. The shortest light emission interval is changed by updating the control level. If the current control level does not change, this step may be omitted. After the control level is updated, the microcomputer 101 stores the result in the RAM included in the microcomputer 101, and the processing proceeds to step S905.

In step S905, the microcomputer 101 determines whether the control level updated in step S904 is a warning level. If the control level is not updated in step S904 and step S904 is omitted, step S905 may be omitted. If the control level is the warning level (YES in step S905), the processing proceeds to step S906. If the control level is not the warning level (NO in step S905), the control level determination process in FIG. 9 ends, and the processing proceeds to step S509. If the control level is not the warning level and the sampling time is updated to a determination processing time for the warning level in step S906, the microcomputer 101 returns the determination processing time to the sampling time set in step S502.

In step S906, the microcomputer 101 updates the sampling time set in step S502 to the determination processing time for the warning level. The "determination processing time" refers to a time longer than the sampling time set in step S502. This is because, if update is performed in the sampling time set in step S502, in warning display in next step S907, a phenomenon such as chattering in display occurs, and not only is it difficult to view the display, but also a user may mistake the phenomenon as a failure of the illumination apparatus 100. After the determination processing time for the warning level is applied, the microcomputer 101 stores the result in the RAM included in the microcomputer 101, and the processing proceeds to step S907.

In step S907, the microcomputer 101 executes display control for displaying warning display for the corresponding warning level on the display unit 114 and causes continuous light emission control once after the next light emission operation. Then, the control level determination process ends, and the processing proceeds to step S509. In this continuous light emission control, the microcomputer 101 performs control for delaying the next determination of whether the charging is completed (step S307) for a time set according to the control level determined in step S903 after the light emission operation. That is, the microcomputer 101 restricts light emission, thereby controlling the time from the execution of a first light emission operation to the execution of a second light emission operation.

Figure 10:
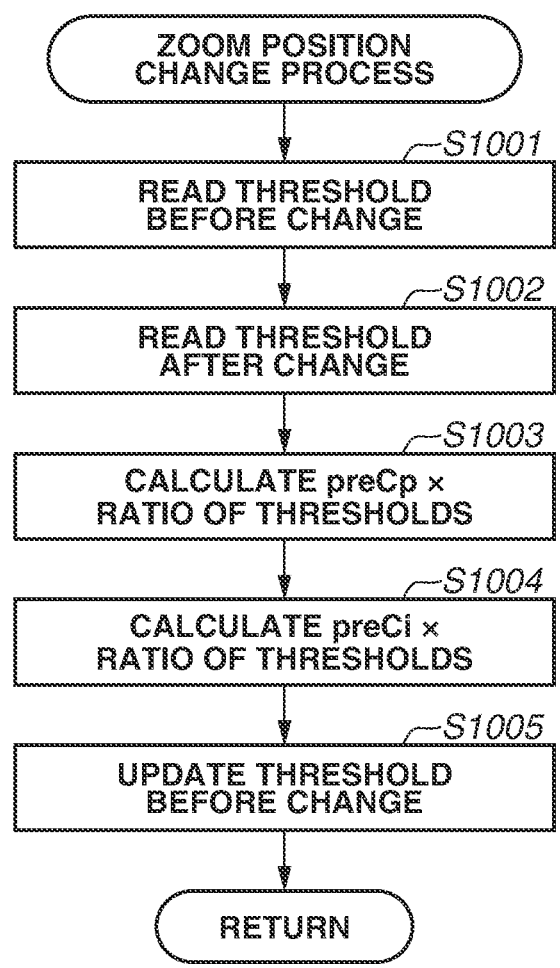
FIG. 10 is a flowchart for a zoom position change process in step S513 in FIG. 5.

Next, with reference to a flowchart in FIG. 10, a description is given of the zoom position change process (step S513) in the continuous light emission control process.

In step S1001, the microcomputer 101 reads the determination threshold for the control temperature Tf at the control level determined in step S508 at the zoom position before the zoom position changes. After the determination threshold before the change is read, the processing proceeds to step S1002. In step S1002, the microcomputer 101 reads the determination threshold for the control temperature Tf at the control level determined in step S508 at the zoom position after the zoom position changes. After the determination threshold after the change is read, the processing proceeds to step S1003.

In step S1003, the microcomputer 101 performs a conversion process on the panel temperature counter preCp as the calculation result in step S509 with the ratio of the determination thresholds read in steps S1001 and S1002. This is because the range of the control level differs with respect to each zoom position. If preCp' represents the panel temperature counter after the conversion, the panel temperature counter preCp' is obtained by the following equation (18), where the determination threshold before the conversion is FPZ and the determination threshold after the conversion is FAZ.

$$preCp'=preCp \times FAZ/FPZ \quad (18)$$

preCp' calculated by equation (18) is fed back as preCp after the conversion process to the next sampling. Then, if a zoom position change operation is performed, the conversion process is immediately performed.

After the conversion process in step S1003, the microcomputer 101 stores the calculation result in the RAM included in the microcomputer 101, and the processing proceeds to step S1004.

In step S1004, if preCi represents the internal temperature counter that is the calculation result in step S510, the microcomputer 101 performs a conversion process on the internal temperature counter preCi with the ratio of the determination thresholds read in steps S1001 and S1002. Then, the converted internal temperature counter preCi' is obtained by the following equation (19).

$$preCi'=preCi \times FAZ/FPZ \quad (19)$$

preCi' calculated by equation (19) is fed back as preCi after the conversion process to the next sampling. If a zoom position change operation is performed, the conversion process is immediately performed.

After the conversion process in step S1004, the microcomputer 101 stores the calculation result in the RAM included in the microcomputer 101, and the processing proceeds to step S1005.

In step S1005, the microcomputer 101 updates the determination threshold before the change to the determination threshold after the change and stores the determination threshold after the change in the RAM included in the microcomputer 101. Consequently, the current determination threshold can be used as the determination threshold before the change in the next sampling. The microcomputer 101 also sets a bit indicating that the zoom position is changed. If this bit is already set, the control level determination process in step S508 is not performed. This is because feedback is performed in the panel continuous light emission control process. Immediately after the zoom position changes, the control temperature Tf is calculated using the panel temperature counter Cp and the internal temperature counter Ci calculated at the previous zoom position. If the control level is determined at this stage, the control level may be temporarily shifted from a proper value. After the microcomputer 101 stores the bit in the RAM included in the microcomputer 101, the zoom position change process in FIG. 10 ends.

Next, with reference to a flowchart in FIG. 11, a description is given of the cooling unit driving control process that starts in conjunction with the continuous light emission control process in FIG. 5. The cooling unit driving control process is the process of cooling the optical panel 111 by the cooling unit 117 sending air to the optical panel 111 to protect the light-emitting unit 100b, particularly the optical panel 111, from the influence of heat generated by light emission from the discharge tube 104. The operation output Dt for sending air is determined based on the control temperature Tf, whereby it is possible to perform control for increasing the operation output Dt to raise the cooling efficiency when the temperature of the optical panel 111 is high, and decreasing the operation output Dt to reduce the driving sound and power consumption when the temperature of the optical panel 111 is low.

If the control temperature Tf is calculated in step S507 in FIG. 5, the microcomputer 101 starts the cooling unit driving control process illustrated in FIG. 11.

In step S1101, the microcomputer 101 reads the result of the control temperature Tf calculated in step S507 from the RAM. After the control temperature Tf is read, the processing proceeds to step S1102. In step S1102, the microcomputer 101 reads a plurality of cooling unit driving control thresholds for determining the operation output Dt of the cooling unit 117 from the RAM included in the microcomputer 101, and the processing proceeds to step S1103. In step S1103, the microcomputer 101 determines at which cooling control level among the plurality of cooling unit driving control thresholds read in step S1102 the control temperature Tf read in step S1101 is. Then, the microcomputer 101 determines the operation output Dt corresponding to the determined cooling control level. Specifically, information indicating the value of the operation output Dt for each cooling control level is held in advance in the ROM of the microcomputer 101, and the determination is made using this information. After the operation output Dt is determined, the microcomputer 101 stores the result of the operation output Dt in the RAM included in the microcomputer 101, and the processing proceeds to step S1104. In step S1104, the microcomputer 101 updates a driving control setting to drive the cooling unit 117 with the operation output Dt determined in step S1103. After the driving control setting is updated, the microcomputer 101 stores the result of the setting in the RAM included in the microcomputer 101, and the processing proceeds to step S1105.

In step S1105, the microcomputer 101 confirms whether the cooling unit 117 is being driven with the operation output Dt set in step S1104 and there is an abnormality in the operation output Dt. If there is no abnormality in the operation output Dt (NO in step S1105), the cooling unit driving control process in FIG. 11 ends, and the processing returns to step S302. If there is an abnormality in the operation output Dt (YES in step S1105), the processing proceeds to step S1106.

In step S1106, the microcomputer 101 determines that the cooling unit 117 cannot normally operate due to a failure. The microcomputer 101 stops the driving of the cooling unit 117 and then updates the settings of the calculation parameters. After the settings of the calculation parameters are updated, the cooling unit driving control process in FIG. 11 ends.

Alternatively, in step S1103, the operation output Dt of the cooling unit 117 may be determined based on the determination threshold used to determine the control level in step S903, instead of the cooling unit driving control thresholds in step S1102. Consequently, it is difficult to finely adjust the operation output Dt, but it is possible to eliminate the need for a table of the cooling unit driving control thresholds, and it is also possible to link the shortest light emission interval and the operation output Dt with respect to each control level.

Figure 12:
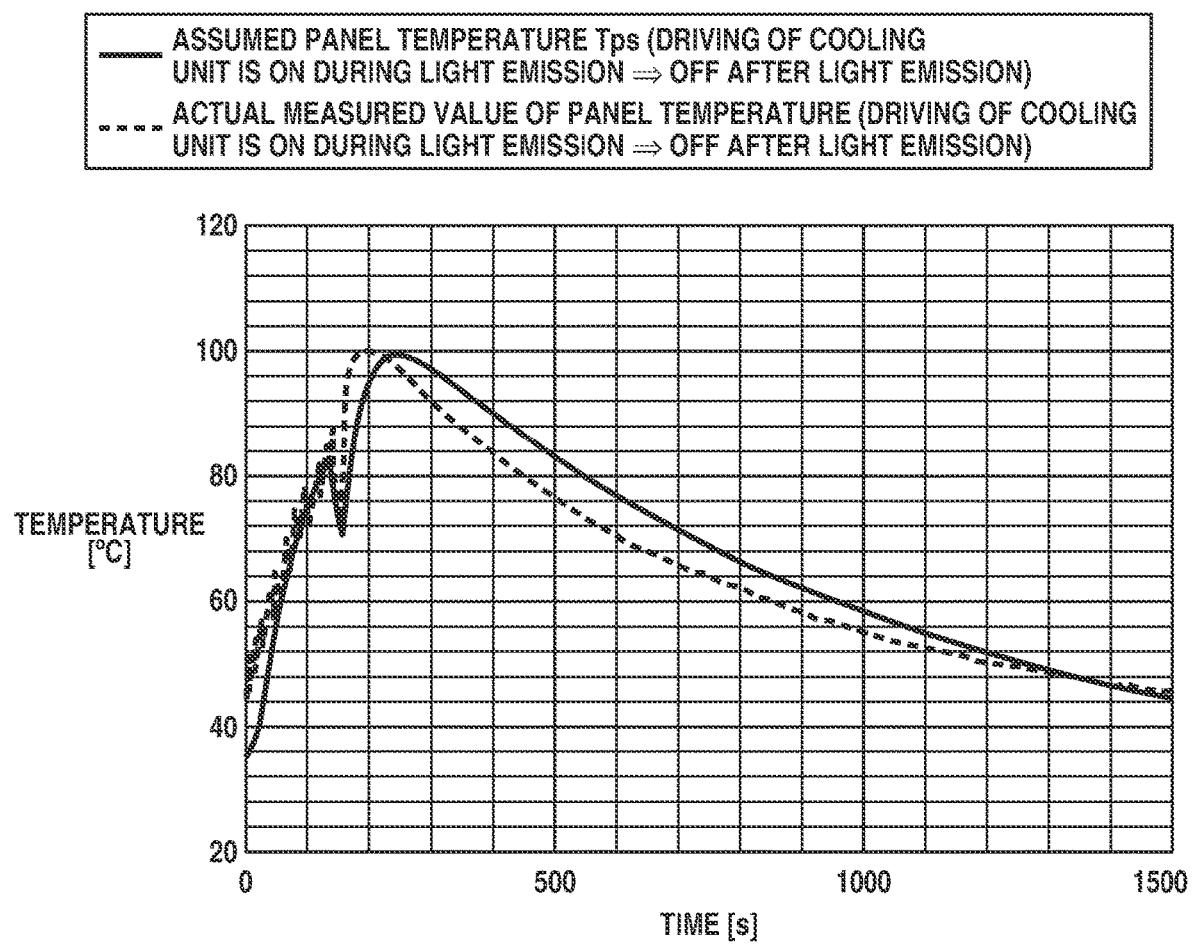
FIG. 12 is a graph illustrating an actual measured value of a temperature of an optical panel and an assumed panel temperature of the optical panel.

Next, with reference to a graph in FIG. 12, a description is given of the relationship between the assumed panel temperature and the actual measured value of the temperature of the optical panel 111 according to the present exemplary embodiment. FIG. 12 is a graph illustrating the actual measured value of the temperature of the optical panel 111 and the assumed panel temperature of the optical panel 111. As described above, the assumed panel temperature can be obtained by equation (12).

The graph illustrates the result of the temperature of the optical panel 111 in a case where the driving of the cooling unit 117 is stopped through the input unit 113 when 150 seconds elapse after continuous light emission ends in the state where the cooling unit 117 is being driven. In the example illustrated in FIG. 12, according to the actual measured value indicated by a dotted line, the temperature of the optical panel 111 rises to near 88° C. by the continuous light emission and then temporarily falls to near 72° C. until the driving of the cooling unit 117 stops. However, the temperature rises to near 100° C. again due to the heat of the internal space of the light-emitting unit 100b heated by the discharge tube 104 after the cooling unit 117 stops. By the series of processes and calculations described above, the assumed panel temperature Tps in equation (12) indicated by a solid line can assume a change in the temperature of the optical panel 111 that occurs by the cooling unit 117 stopping after being driven. That is, in the present exemplary embodiment, it is possible to achieve continuous light emission control while reducing costs without using a known temperature sensor.

Next, with reference to FIGS. 13A to 13D, a description is given of various calculation expressions (steps S604 to S607 and steps S609 to S611) used in the discharge tube continuous light emission control process in FIG. 6.

Figure 13A:
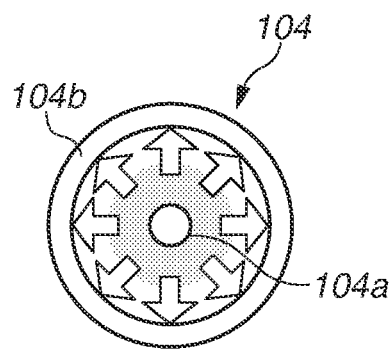
FIGS. 13A to 13D are diagrams illustrating heat transfer models of a discharge tube of the illumination apparatus according to the first exemplary embodiment of the present disclosure.
Figure 13B:
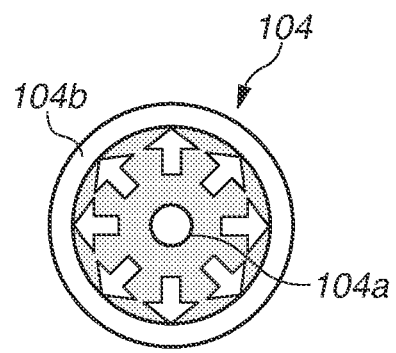
Figure 13C:
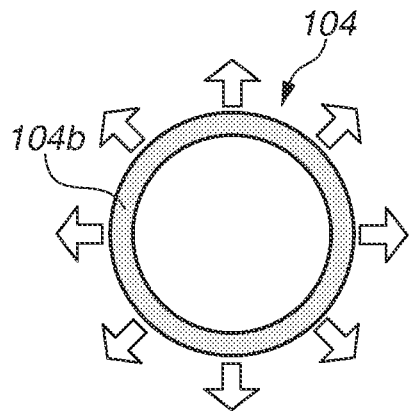
Figure 13D:
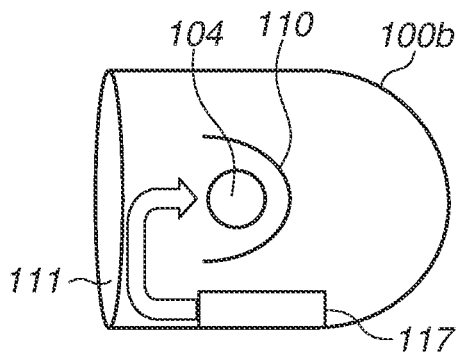

FIGS. 13A to 13D are diagrams illustrating heat transfer models of the discharge tube 104 and are cross-sectional views of the discharge tube 104. The discharge tube 104 emits light and generates heat by a discharge current 104a flowing from the anode to the cathode in the discharge tube 104. FIG. 13A is a diagram illustrating heat radiation from the discharge current 104a to a discharge tube glass portion 104b. FIG. 13B is a diagram illustrating heat transmission from the hollow internal space of the discharge tube 104 heated by the discharge current 104a to the discharge tube glass portion 104b. FIG. 13C is a diagram illustrating heat transmission when the heated discharge tube glass portion 104b dissipates heat to the external space after the discharge tube 104 emits light. FIG. 13D is a diagram illustrating heat transmission when the discharge tube glass portion 104b heated by the light emission dissipates heat under the influence of air sent from the cooling unit 117. In the present exemplary embodiment, on the assumption that the difference between the inner diameter and the outer diameter of the tube of the discharge tube 104 is small, the influence of heat transmission inside the glass of the tube is ignored for ease of description.

First, as illustrated in FIG. 13A, the discharge tube glass portion 104b is heated by heat radiation from the discharge current 104a. If this amount of heat is a radiation heating amount Rhx, the radiation heating amount Rhx is obtained by the following equation (20), using the light emission energy NL.

$$Rhx = NL \times Sx / Rhcx \quad (20)$$

Rhcx represents a radiation heating coefficient, and Sx represents a light emission time coefficient. The light emission time coefficient Sx is a coefficient that takes a value greater than 1 in the case of flat light emission when the coefficient takes 1 in the case of flash light emission. This indicates that even if the light emission energy NL consumed by the light emission operation of the discharge tube 104 is the same, the longer the time in which the discharge current 104a flows is, the more likely the temperature of the discharge tube glass portion 104b is to rise. In equation (4), since the distance from the discharge tube 104 to the optical panel 111 changes according to the zoom operation, the influence on heat radiation is represented by the variable Rhc. In contrast, since the distance from the discharge tube glass portion 104b to the discharge current 104a is not influenced by the zoom position, the radiation heating coefficient Rhcx may be a constant. Regarding the distance from the discharge current 104a to the discharge tube glass portion 104b, since the diameter of a discharge tube of an illumination apparatus used in a general imaging apparatus is several millimeters, the attenuation of radiant heat due to the distance may be ignored, and the radiation heating coefficient Rhcx may be 1.

As illustrated in FIG. 13B, after the discharge tube 104 emits light, heat transmission from the internal space of the heated discharge tube 104 to the discharge tube glass portion 104b occurs with a time lag from the time when the above heat radiation occurs. If the amount of this heat transmission is a heat transmission heating amount Hhx, the heat transmission heating amount Hhx is obtained by the following equation (21).

$$Hhx = (preCix - preCx)/Hhcx \tag{21}$$

Cix represents an internal temperature counter, and Cx represents a discharge tube temperature counter. The prefix "pre" indicates the result of calculation in a sampling time one or more times before this sampling time. Hhcx represents a heat transmission coefficient when the heat of the internal space of the discharge tube 104 is transmitted to the discharge tube glass portion 104b.

As illustrated in FIG. 13C, the discharge tube glass portion 104b is heated and also dissipates heat at the same time. If the amount of heat dissipated from the discharge tube glass portion 104b to the external space is a discharge tube heat emission amount Fx, the discharge tube heat emission amount Fx is obtained by the following equation (22).

$$Fx = (preCx - preTx)/Fhcx \tag{22}$$

Tx represents a space ambient temperature near the discharge tube 104 or a counter as a substitute for the space ambient temperature. Fhcx represents a heat transmission coefficient when the discharge tube glass portion 104b dissipates heat.

In FIG. 13C, further, the heat of the heated discharge tube glass portion 104b is transmitted to the entirety of the discharge tube glass portion 104b and also dissipated to the external space through the entirety of the surface. This is because the heat distribution of the discharge tube glass portion 104b is not uniform according to the position where the discharge current 104a is generated. With reference to equation (9), if the amount of heat dissipated to the external space through the exterior is an internal cooling amount Fix by regarding the exterior as the entirety of the discharge tube glass portion 104b, the internal cooling amount Fix is obtained by the following equation (23).

$$Fix = (preCi - preTx)/Ficx \tag{23}$$

Fix represents an internal cooling coefficient.

As illustrated in FIG. 13D, the discharge tube glass portion 104b is cooled by the circulation of air in the internal space of the light-emitting unit 100b by the cooling unit 117 sending air to the discharge tube glass portion 104b. If the amount of heat by which the discharge tube glass portion 104b is forcibly cooled by the cooling unit 117 is a forcible cooling heat amount Ax, the forcible cooling heat amount Ax is obtained by the following equation (24).

$$Ax = (Afx \times Dt \times Afcx)/Fhcx \tag{24}$$

Afx represents a cooling flow rate, Dt represents an operation output, and Afcx represents a conversion coefficient. In a configuration in which the discharge tube 104 is not included in the air circulation path of the cooling unit 117 or in a configuration in which convection does not occur in the internal space of the light-emitting unit 100b, the terms of equation (24) may be ignored.

Next, the internal temperature counter Cix illustrated in equation (21) is obtained. As illustrated in FIG. 13B, the internal space of the discharge tube 104 is heated by heat transmission when the discharge tube 104 emits light. If this amount of heat is a heat generation amount Hvx, the heat generation amount Hvx is obtained by the following equation (25), using the light emission energy NL.

$$Hvx = (NL \times CSx)/Cicx \tag{25}$$

Cicx represents an internal temperature coefficient and is a conversion coefficient for conversion from the light emission energy NL to the heat generation amount Hvx. CSx represents conversion gain and has the function of adjusting a shift in conversion to the heat generation amount Hvx, which changes according to the temperature of the internal space of the discharge tube 104.

The internal temperature counter Cix illustrated in equation (21) is obtained by the following equation (26).

$$Cix = preCix + preHvx - preFix - preApx/Crx \tag{26}$$

Apx represents a forcible cooling heat amount, and Crx represents the ratio of contribution of preAPx to the internal temperature counter Cix.

The discharge tube temperature counter Cx illustrated in equation (21) is obtained by the following equation (27).

$$Cx = preCx + Rhx + Hhx - Fx - Apx \tag{27}$$

Consequently, the heat transmission heating amount Hhx can be obtained by equation (21).

Next, an assumed temperature of the discharge tube glass portion 104b (hereinafter referred to as an "assumed discharge tube temperature") that is assumed is calculated using the discharge tube temperature counter Cx obtained by equation (27) and the internal ambient temperature Tx. If the assumed discharge tube temperature is Txs, the assumed discharge tube temperature Txs is obtained by the following equation (28).

$$Txs = Tx + Cx/Tcx \tag{28}$$

Tcx represents a temperature conversion coefficient. If the internal ambient temperature Tx is found, the assumed discharge tube temperature at this time can be obtained by equation (28). The present exemplary embodiment assumes the achievement of continuous light emission control while reducing costs without using a known temperature sensor. Moreover, to simplify the control, the subsequent calculations are performed on the assumption that Tx=0.

If equation (28) is developed and organized to perform the calculations regarding the continuous light emission control process, the following equation (29) is obtained.

$$Tfx = NL \times Sx/(Rhcx \times Tcx) + (1/Tcx - 2/(Hhcx \times Tcx)) \times \\ preCx + preCix/(Hhcx \times Tcx) - (Afx \times Dt \times Afc)/(Hhcx \times Tcx) \tag{29}$$

(Because Tfx=Txs−Tx, Hhcx=Fhcx, Tx=0)

Tfx represents a control temperature, is the relative temperature of the discharge tube glass portion 104b, also has the role of a light emission counter, and is used in a determination for control described below.

If the first term on the right side of equation (29) is a control temperature addition amount Tfux, the second and third terms on the right side of equation (29) are a control progress temperature Tfdx, and the fourth term on the right side of equation (29) is a control temperature subtraction amount Tfax, the following equation (30) is obtained.

$$\begin{cases} Tfux = NL \times Sx/(Rhcx \times Tcx) \\ Tfdx = (1/Tcx - 2/(Hhcx \times Tcx)) \times preCx + preCix/(Hhcx \times Tcx) \\ Tfax = (Afx \times Dt \times Afcx)/(Hhcx \times Tcx) \\ Tfx = Tfux + Tfdx - Tfax \end{cases} \tag{30}$$

The control temperature addition amount Tfux represents the heat generation of the discharge tube glass portion 104b due to heat radiation in this sampling. The control progress temperature Tfdx represents the assumed discharge tube temperature in this sampling that is assumed from the calculation results in the previous sampling. The control temperature subtraction amount Tfax represents the cooling heat amount by which the discharge tube 104 is cooled by the cooling unit 117 in this sampling. The control progress temperature Tfdx includes the discharge tube temperature counter preCx in the previous sampling and the internal temperature counter preCix in the previous sampling. Thus, based on the flowchart in FIG. 6, the calculations in a single sampling event can be completed by the following three equations (31), (32), and (33).

preCx' represents a discharge tube temperature counter in the next sampling, and preCix' represents an internal temperature counter in the next sampling.

$$preCx'=(1-1/Hhcx) \times preCx + preCix/Hhcx + NL \times Sx/Rhcx - (Af \times Dt \times Afc)/Hhcx \quad (31)$$

$$preCix'=preCix+(preNL \times CSx)/Cicx-(Af \times preDt \times Afc)/(Hhcx \times Cr) \quad (32)$$

$$preFix = preCix/Ficx \quad (33)$$

preCx' and preCix' calculated by equations (31) and (32) are fed back as preCx and preCix after the conversion process to the next sampling.

These are the calculation equations used in the discharge tube continuous light emission control process. That is, calculations are performed using the first equation of equation (30) in step S604, the second equation of equation (30) in step S605, the third equation of equation (30) in step S606, and the fourth equation of equation (30) in step S607. Moreover, calculations are performed using equation (31) in step S609, equation (32) in step S610, and equation (33) in step S611. By equations (31) to (33), the discharge tube temperature counter, the internal temperature counter, and the internal cooling heat amount, respectively, to be fed back to the next sampling are calculated. Consequently, it is possible to calculate the assumed discharge tube temperature based on a heat dissipation time, a blast volume determined according to the operation output Dt of the cooling unit 117 and the corresponding cooling flow rate Afx, and a temperature difference in the discharge tube 104 and the internal space of the light-emitting unit 100b.

Figure 14:
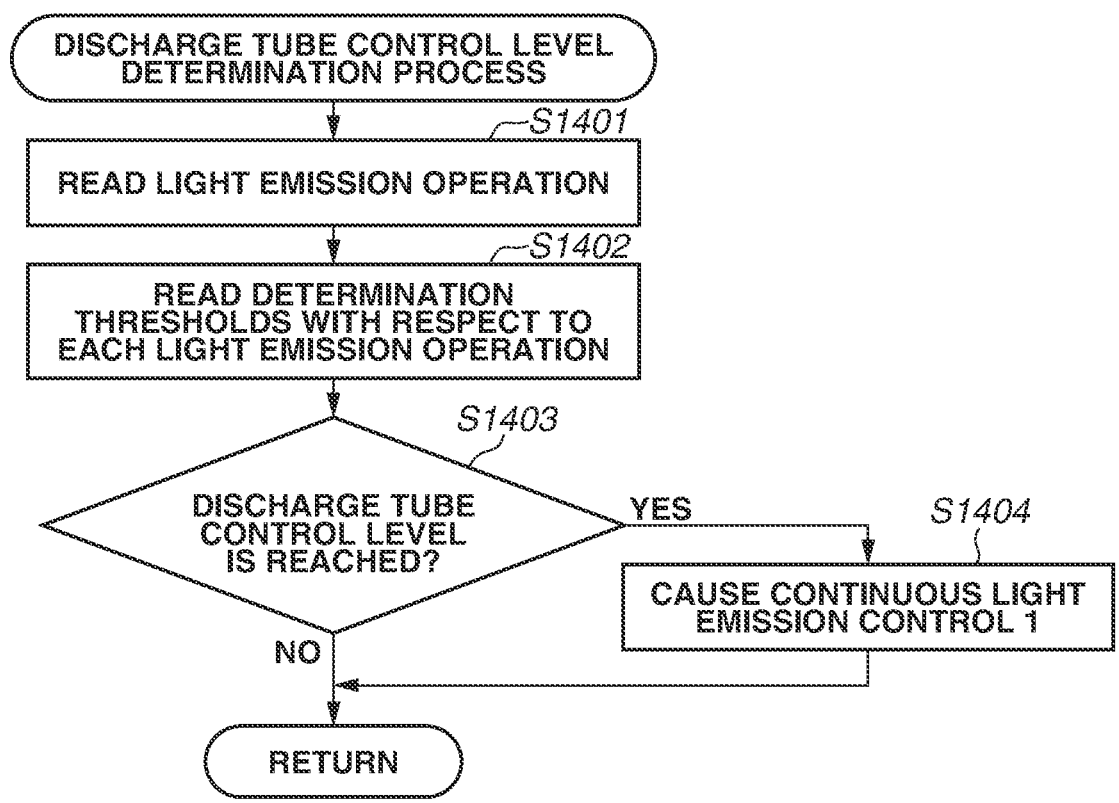
FIG. 14 is a flowchart for a discharge tube control level determination process in step S608 in FIG. 6 according to the first exemplary embodiment of the present disclosure.

Next, with reference to a flowchart in FIG. 14, a description is given of the discharge tube control level determination process (step S608) in the continuous light emission control process.

In step S1401, the microcomputer 101 acquires from the settings made in step S301 the setting of the light emission operation when light is emitted in this sampling. After the microcomputer 101 stores the result in the RAM included in the microcomputer 101, the processing proceeds to step S1402. The setting of the light emission operation in the present exemplary embodiment indicates an operation setting in which the light emission time differs according to a single light emission instruction, such as flash light emission or flat light emission. In step S1402, the microcomputer 101 reads a plurality of determination thresholds set corresponding to the light emission operation acquired in step S1401 from the RAM included in the microcomputer 101, and the processing proceeds to step S1403. The plurality of determination thresholds indicates thresholds for the control temperature Tfx determined with respect to each light emission operation.

In step S1403, the microcomputer 101 determines whether the control temperature Tfx obtained in step S608 exceeds any of the determination thresholds read in step S1402. If the control temperature Tfx exceeds any of the determination thresholds (YES in step S1403), the processing proceeds to step S1404. If the control temperature Tfx does not exceed the determination thresholds (NO in step S1403), the discharge tube control level determination process in FIG. 14 ends, and the processing proceeds to step S609.

In step S1404, if the control temperature Tfx exceeds any of the determination thresholds in step S1403, the microcomputer 101 causes continuous light emission control 1 once after the next light emission operation. Then, the discharge tube control level determination process ends, and the processing proceeds to step S609. In the continuous light emission control 1, while the control temperature Tfx obtained in step S607 exceeds the determination threshold in step S1403, the microcomputer 101 performs control for delaying the next determination of whether the charging is completed (step S307) for any time determined in advance after the light emission operation, regardless of the setting of the light emission. This is because the heat dissipation speed of the discharge tube glass portion 104b is fast. Thus, the time in which the discharge current 104a does not flow is only provided for several seconds, whereby it is possible to perform control for reducing the temperature rise in the discharge tube 104.

If it is necessary to cause the continuous light emission control in step S907 and it is also necessary to cause the continuous light emission control 1 in step S1404, the control for delaying the next determination of whether the charging is completed (step S307) after the light emission operation may only need to be caused once. In this case, the next determination of whether the charging is completed may be delayed for the longer time between the time set according to the control level determined in step S903 and the time determined in advance for use in step S1404. In the present exemplary embodiment, the cooling unit driving control process illustrated in FIG. 11 according to the calculation result of the discharge tube control temperature Tfx in step S607 in FIG. 6 is not performed. This is because, due to the configuration of the present exemplary embodiment, the cooling unit 117 has a flow path configuration designed to cool the optical panel 111, and does not positively ensure a flow path for the discharge tube 104. Moreover, also because the heat dissipation speed of the discharge tube glass portion 104b is fast and the discharge tube glass portion 104b is cooled by a cooling method based on the internal circulation of air near the discharge tube 104, it can be said that the degree of influence of an increase in the air volume on the temperature of the discharge tube glass portion 104b is small. In the case of a configuration having the effect of cooling the discharge tube 104 due to air from the cooling unit 117, a flowchart similar to that in FIG. 11 may be created, and the operation output of the cooling unit 117 may be determined in conjunction with the calculation result of the discharge tube control temperature Tfx.

Figure 15A:
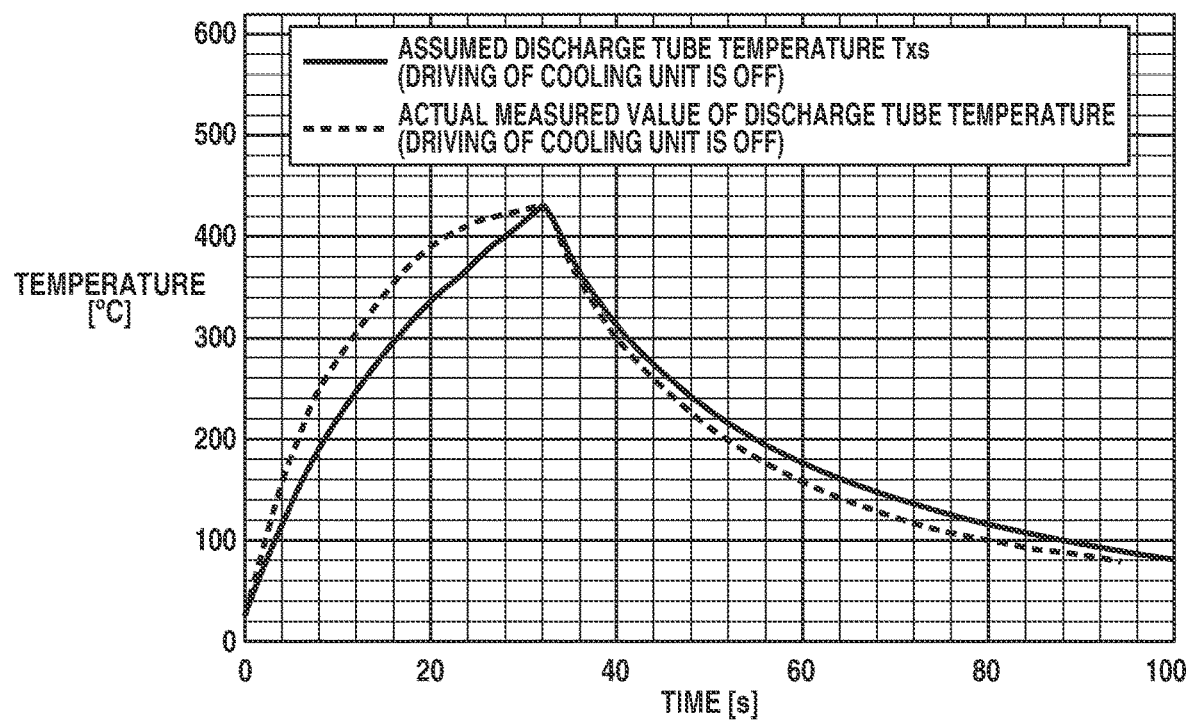
FIGS. 15A and 15B are graphs illustrating an actual measured value of a temperature of the discharge tube and an assumed discharge tube temperature of the discharge tube.
Figure 15B:
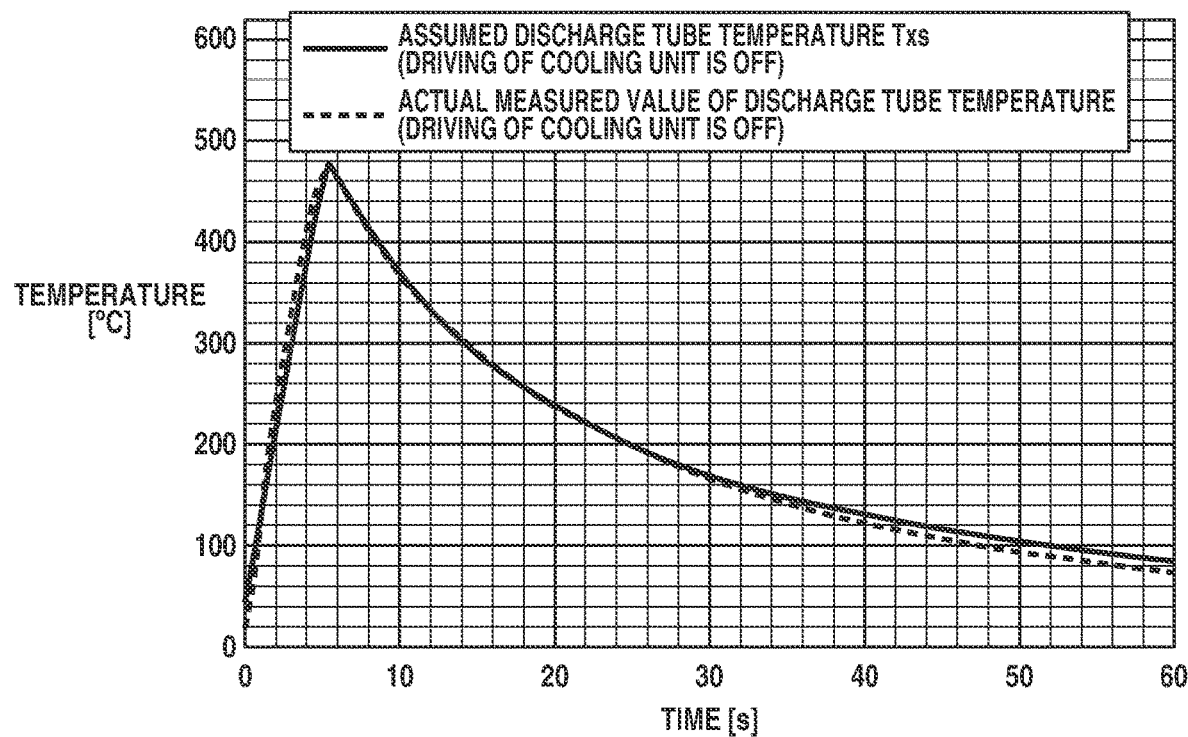

Next, with reference to graphs in FIGS. 15A and 15B, a description is given of the relationship between the assumed discharge tube temperature and the actual measured value of the temperature of the discharge tube 104 according to the present exemplary embodiment. FIGS. 15A and 15B are graphs illustrating the actual measured value of the temperature of the discharge tube glass portion 104b based on thermography and the assumed discharge tube temperature of the discharge tube glass portion 104b. As described above, the assumed discharge tube temperature can be obtained by equation (28).

FIG. 15A is a temperature graph when light continues to be emitted about 20 times per second with a 1/64 of the amount of light of manual flash light emission, and the light emission is stopped after about 32 seconds. FIG. 15B is a temperature graph when light continues to be emitted about 18 times per second with a 1/64 of the amount of light of manual flat light emission, and the light emission is stopped after about 6 seconds.

In the example of FIG. 15A, according to the actual measured value indicated by a dotted line, the temperature of the discharge tube glass portion 104b rises to near 430° C. by the continuous light emission for about 32 seconds. In the example of FIG. 15B, according to the actual measured value indicated by a dotted line, the temperature of the discharge tube glass portion 104b rises to near 490° C. by the continuous light emission for about 6 seconds. In each of FIGS. 15A and 15B, the assumed discharge tube temperature indicated by a solid line is approximately equal to the actual measured value.

Next, with reference to FIGS. 16A to 16F, a description is given of the difference in light emission time with the same amount of light between flash light emission and flat light emission, which are different in the method for the light emission operation. FIGS. 16A to 16F are graphs each illustrating a time axis from the application of a pulse voltage to the discharge tube 104 to the end of light emission. FIG. 16A is a schematic diagram of the trigger waveform of the flash light emission. FIG. 16B is a schematic diagram of the flash light emission waveform. FIG. 16C is a graph illustrating the integral value of a light reception current when the flash light emission is performed. FIG. 16D is a schematic diagram of the trigger waveform of the flat light emission. FIG. 16E is a schematic diagram of the flat light emission waveform. FIG. 16F illustrates the integral value of a light reception current when the flat light emission is performed. In each of FIGS. 16A to 16F, the horizontal axis represents time.

In FIG. 16A, the trigger circuit 103 receives the trigger waveform of a flash light emission instruction from the light emission control circuit 105. Then, in FIG. 16B, after a communication time T elapses, the discharge tube 104 is excited by the trigger circuit 103 applying a pulse voltage to the discharge tube 104. In FIG. 16C, the photodiode 106 integrates a light reception current of light received from the discharge tube 104 until the light reception current reaches a specified integral value. This flash light emission time is represented as "S".

In FIG. 16D, the trigger circuit 103 receives the trigger waveform of a flat light emission instruction from the light emission control circuit 105. Then, in FIG. 16E, after a communication time T elapses, the discharge tube 104 is excited by the trigger circuit 103 applying a pulse voltage to the discharge tube 104. In FIG. 16F, the photodiode 106 integrates a light reception current of light received from the discharge tube 104 until the light reception current reaches a specified integral value. This flat light emission time is represented as "F".

The integral values illustrated in FIGS. 16C and 16F are those of the same light reception current. At this time, the difference between the voltages before and after the light emission that is calculated in step S703 has the same value between the flash light emission and the flat light emission in FIGS. 16A to 16F, and the value of the light emission energy NL also has the same value. As in the flash light emission time S and the flat light emission time F illustrated in FIGS. 16A to 16F, however, the time in which the discharge tube 104 is excited is longer in the flat light emission.

As illustrated in FIGS. 15A and 15B and FIGS. 16A to 16F, even if the light emission amount is the same, the excitation time of the discharge tube 104 differs between the flash light emission and the flat light emission. Further, if light is continuously emitted for a short time in each of the flash light emission and the flat light emission, the excitation time differs with respect to each light emission operation. Thus, the difference in the temperature rise speed of the discharge tube glass portion 104b as illustrated in FIGS. 15A and 15B occurs. Thus, as in a case where the time in which the discharge current 104a flows when light is emitted is longer in the flat light emission than in the flash light emission among a plurality of light emission operations, the longer the time in which the discharge current 104a flows when light is emitted is, the more likely the temperature of the discharge tube glass portion 104b is to rise. In the present exemplary embodiment, the difference in the temperature rise in the discharge tube glass portion 104b due to the light emission operation is indicated by the light emission time coefficient Sx illustrated in equation (20). That is, in the present exemplary embodiment, by the series of processes and calculations described above, it is possible to assume a change in the temperature of the discharge tube glass portion 104b according to the light emission operation of the discharge tube 104.

Although the temperature of the discharge tube glass portion 104b exceeds 400° C. in each of the graphs illustrated in FIGS. 15A and 15B, the determination thresholds in step S1402 in FIG. 14 may be lowered in view of the actual performance such as the heat-resistant temperature of the discharge tube glass portion 104b, a temperature zone where a missing of emission starts, or the frequency of a missing of emission. The time for which the next determination of whether the charging is completed (step S307) is delayed by the discharge tube continuous light emission control in step S1404 may be determined in view of the actual performance such as the heat dissipation speed of the discharge tube glass portion 104b.

This is because the heat dissipation speed regarding the actual measured value of the discharge tube temperature illustrated in FIGS. 15A and 15B is faster than the heat dissipation speed regarding the actual measured value of the panel temperature illustrated in FIG. 12, and the condition that the temperature of the discharge tube glass portion 104b is likely to rise is high-speed continuous image capturing for a short time.

In a case where a non-light emission time is provided, as illustrated in equation (29) and FIGS. 15A and 15B, a heat dissipation phenomenon at the control temperature Tfx of the discharge tube 104 is represented as a counter for a subtraction process, whereby it is possible to find the time necessary and sufficient to cool the discharge tube glass portion 104b.

In the present exemplary embodiment, a description has been given of control for reducing the temperature rises in the optical panel 111 and the discharge tube 104 by independently performing the panel continuous light emission control process illustrated in FIG. 5 and the discharge tube light emission control process illustrated in FIG. 6. Then, equations (4) to (17) necessary to calculate the assumed panel temperature Tps and equations (20) to (33) necessary to calculate the assumed discharge tube temperature Txs have been described in detail. In these equations, the distance between the optical panel 111 and the discharge tube 104 is important as a parameter that greatly influences the calculation of the assumed panel temperature Tps, and the radiation heating amount Rh in equation (4) is set with respect to each zoom position. On the other hand, the time in which the discharge current 104a flows by the light emission operation is important as a parameter that greatly influences the calculation of the assumed discharge tube temperature Txs, and the light emission time coefficient Sx in equation (20) is set with respect to each light emission operation. That is, the assumed discharge tube temperature Txs is calculated based on a first influence degree of the heat generated by the light emission operation, and the assumed panel temperature Tps is calculated based on a second influence degree of the heat generated by the light emission operation different from the first influence degree.

Although the models of the calculation expressions for each of the assumed panel temperature Tps and the assumed discharge tube temperature Txs take into account heat radiation, heat transmission heating, heat transmission cooling, and forcible cooling, calculation expressions simplified by omitting some of these may be used.

In the present exemplary embodiment, the description has been given on the assumption that the microcomputer 101 has a circuit configuration of a one-chip IC with a built-in microcomputer including a CPU that executes the above series of processes and a RAM that stores various pieces of information. The present disclosure, however, is not limited to this. For example, a dedicated control unit, a dedicated determination unit, or a dedicated memory that executes each of the above series of processes may be provided. Although the cooling unit 117 has been described as a fan module, the cooling unit 117 may be a cooling module having an equivalent function, such as a pump. The flowcharts described in the present exemplary embodiment are merely examples, and various processes may be executed in orders different from those in the flowcharts described in the present exemplary embodiment, unless there is an inconvenience.

Figure 17:
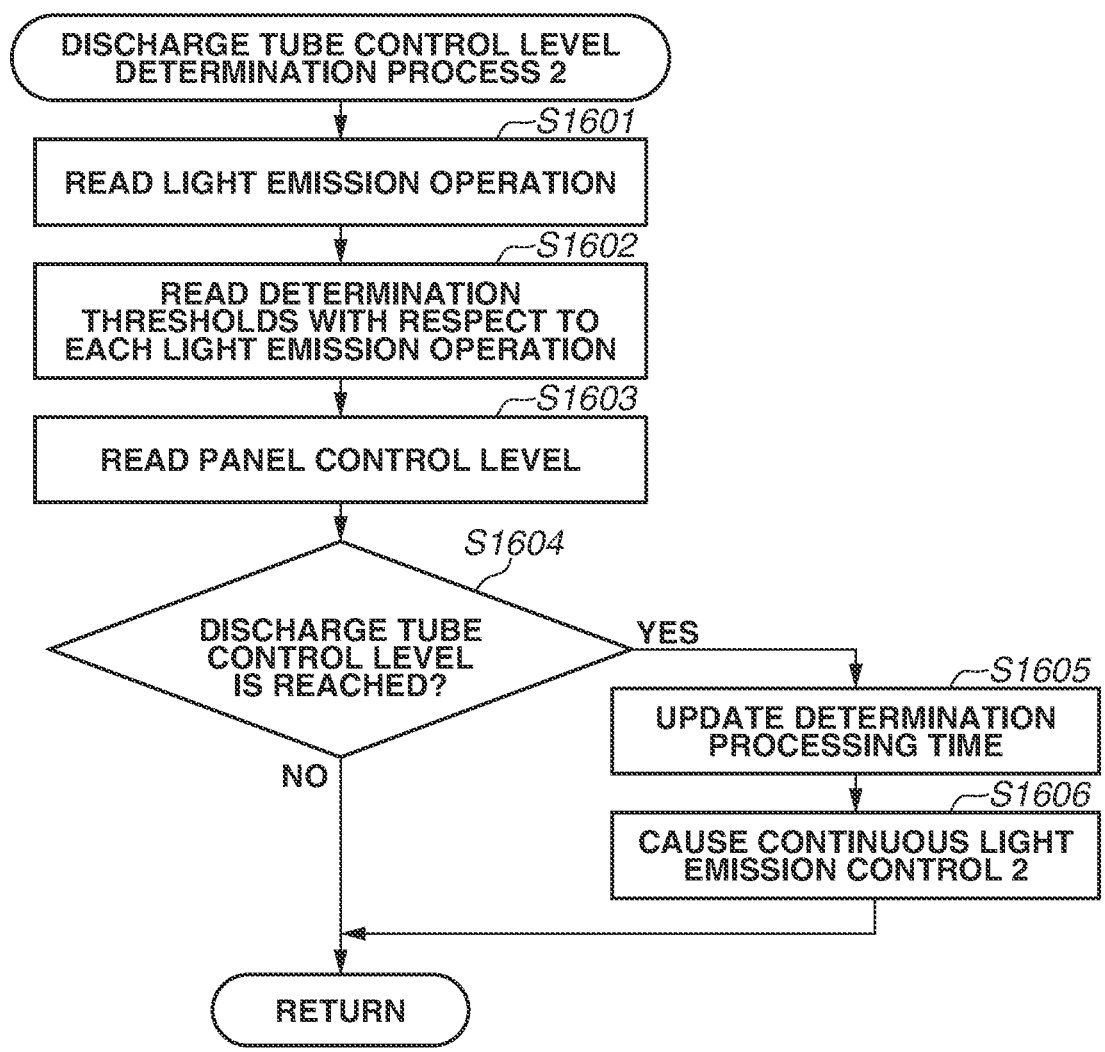
FIG. 17 is a flowchart for a discharge tube control level determination process in step S608 in FIG. 6 according to a second exemplary embodiment of the present disclosure.

With reference to FIG. 17, a second exemplary embodiment of the present disclosure is described below. The present exemplary embodiment is different from the first exemplary embodiment in a discharge tube control level determination process. Other portions are similar to those in the first exemplary embodiment, and therefore are not described.

In the present exemplary embodiment, a discharge tube control level determination process 2 illustrated in FIG. 17 is executed in step S608 in the flowchart illustrated in FIG. 6.

The processes of steps S1601 and S1602 are similar to those of steps S1401 and S1402 in FIG. 14, and therefore are not described. In step S1603, the microcomputer 101 reads the panel control level determined in step S508, and the processing proceeds to step S1604. The process of step S1604 is similar to that of step S1403 in FIG. 14, and therefore is not described. In step S1605, similarly to step S906, the microcomputer 101 updates the determination processing time.

In step S1606, the microcomputer 101 causes continuous light emission control 2 once after the next light emission operation. Then, the discharge tube control level determination process 2 ends, and the processing proceeds to step S609. In the continuous light emission control 2, while the control temperature Tfx exceeds the determination threshold in step S1604, the microcomputer 101 performs control for causing the shortest light emission interval according to the panel control level updated in step S904 once after the light emission operation and delaying the next light emission operation, regardless of the setting of the light emission. As described above, in the present exemplary embodiment, the time for which the next determination of whether the charging is completed (step S307) is delayed by the continuous light emission control is made the same as the time set according to the panel control level, whereby it is possible to prevent a plurality of control contents from being mixed together. That is, in the present exemplary embodiment, if it is necessary to cause the continuous light emission control in step S907, the time set according to the control level determined in step S903 is used in both a case where it is not necessary to cause the continuous light emission control 2 and a case where it is necessary to cause the continuous light emission control 2 in step S1606.

Consequently, it is possible to perform control for reducing the temperature rises in the optical panel 111 and the discharge tube 104 while maintaining an operability without a feeling of discomfort when the illumination apparatus 100 continuously emit light and continuous light emission control occurs. As illustrated in FIG. 12 and FIGS. 15A and 15B, the speed of the temperature decrease is faster in the assumed discharge tube temperature Tfx than in the assumed panel temperature Tf. Thus, even if the continuous light emission control operations are unified into the charging completion determination delay time based on the panel continuous light emission control, this control has a sufficient effect as control for reducing the temperature rise in the discharge tube 104. In the control temperatures Tf and Tfx illustrated in equation (29), the influence of subtraction during this sampling can also be represented taking into account the internal cooling amount and the forcible cooling heat amount as parameters regarding heat dissipation. Thus, it is possible to perform control for reducing the temperature rises in the optical panel 111 and the discharge tube 104.

In the above exemplary embodiments, the control processes in steps S311 and S312 in the flowchart for the light emission process in FIG. 3 have been described as control for reducing the temperature rises in the optical panel 111 and the discharge tube 104 when light is continuously emitted. However, a target portion in which the temperature rise is to be reduced is not limited to the optical panel 111 and the discharge tube 104. Alternatively, an electric component of the light-emitting unit 100b that is a member located near the light source and is influenced by the heat generation of the discharge tube 104 due to a light emission operation or an exterior member may be a target portion. In this case, immediately after step S312, a control temperature of the portion to be assumed is calculated as described with reference to equations (4) to (19), and determination thresholds for the assumed portion as illustrated in step S902 are set, whereby it is possible to perform control according to the target in which the temperature rise should be reduced.

In a case where the temperature rise in any target portion of the illumination apparatus 100 different from the optical panel 111 and the discharge tube 104 should be preferentially reduced, the control process in step S311 or S312 may be replaced with a control process on the target portion in which the temperature rise should be preferentially reduced. In this configuration, the target portion in which the temperature rise should be preferentially reduced may be not only in the light-emitting unit 100b, but also in the main body portion 100a. For example, the temperature rise in the battery 200 of the main body portion 100a or the voltage boost unit 102a of the main body portion 100a may be preferentially reduced.

In the above exemplary embodiments, the difference in the temperature rise due to the light emission operation of the discharge tube 104 is indicated by the light emission time coefficient Sx illustrated in equation (20), but may be set to a parameter equivalent to the light emission time. For example, in a case where a light emitter is an LED, the duty cycle of a voltage based on PWM control of the microcomputer 101 is applied to Sx as a coefficient indicating the times of light emission and non-light emission from the LED, whereby it is possible to calculate the difference in the temperature rise based on the duty cycle of the LED. Also in a case where a light emitter is an LED, the temperature of a heat source or a portion near the heat source is calculated as a control temperature, whereby it is possible to perform control for reducing the temperature rise without the need to provide a thermometer element in the periphery of the LED.

While exemplary embodiments of the present disclosure have been described above, the present disclosure is not limited to these exemplary embodiments, and can be modified and changed in various ways within the scope of the present disclosure.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-143623, filed Sep. 9, 2022, which is hereby incorporated by reference herein in its entirety.

What is claimed is:

1. An illumination apparatus comprising:
a first target portion including a light source;
a second target portion different from the light source; and
at least one processor configured to function as:
a light emission control unit configured to control a light emission operation of the light source,
a calculation unit configured to, based on heat generated by the light emission operation of the light source, calculate a first control temperature as a relative temperature of the first target portion and a second control temperature as a relative temperature of the second target portion, and
a control unit configured to control the light emission operation based on at least one of the first and second control temperatures,
wherein the calculation unit calculates the first control temperature based on a first influence degree of the heat generated by the light emission operation and calculates the second control temperature based on a second influence degree of the heat generated by the light emission operation different from the first influence degree.

2. The illumination apparatus according to claim 1, wherein the first influence degree is an influence degree according to at least a light emission amount and a light emission time of the light source.

3. The illumination apparatus according to claim 2, wherein the second influence degree is an influence degree according to at least a light emission amount of the light source and a distance from the light source.

4. The illumination apparatus according to claim 1, wherein the light source is a discharge tube.

5. The illumination apparatus according to claim 1, wherein the light source is a light-emitting diode (LED).

6. The illumination apparatus according to claim 1, wherein the control unit performs control for restricting light emission based on a time determined according to the first and second control temperatures.

7. The illumination apparatus according to claim 1, wherein the first and second influence degrees change according to a method for the light emission operation of the light source.

8. The illumination apparatus according to claim 1, wherein the control unit controls a time from execution of a first light emission operation to execution of a second light emission operation.

9. The illumination apparatus according to claim 8, wherein in a case where the first control temperature exceeds a first threshold, the control unit controls the time from the execution of the first light emission operation to the execution of the second light emission operation based on a time determined in advance.

10. The illumination apparatus according to claim 8, wherein in a case where the first control temperature exceeds a first threshold, the control unit controls the time from the execution of the first light emission operation to the execution of the second light emission operation based on a time set according to the second control temperature.

11. The illumination apparatus according to claim 1, wherein in a case where the first control temperature exceeds a first threshold and the second control temperature exceeds a second threshold, the control unit controls the light emission operation based on the second control temperature.

12. The illumination apparatus according to claim 1, wherein the calculation unit includes a subtraction process based on each of the first and second influence degrees.

13. The illumination apparatus according to claim 1, wherein the second target portion is a member located near the light source.

14. The illumination apparatus according to claim 1, wherein the second target portion is an optical member placed in front of the light source.

15. A control method for controlling an illumination apparatus including a first target portion including a light source, and a second target portion different from the light source, the control method comprising:
based on heat generated by a light emission operation of the light source, calculating a first control temperature as a relative temperature of the first target portion and a second control temperature as a relative temperature of the second target portion; and
controlling the light emission operation based on at least one of the first and second control temperatures,
wherein the first control temperature is calculated based on a first influence degree of the heat generated by the light emission operation, and the second control temperature is calculated based on a second influence degree of the heat generated by the light emission operation different from the first influence degree.

* * * * *